US009619707B2

(12) United States Patent
Sakamaki

(10) Patent No.: US 9,619,707 B2
(45) Date of Patent: Apr. 11, 2017

(54) GAZE POSITION ESTIMATION SYSTEM, CONTROL METHOD FOR GAZE POSITION ESTIMATION SYSTEM, GAZE POSITION ESTIMATION DEVICE, CONTROL METHOD FOR GAZE POSITION ESTIMATION DEVICE, PROGRAM, AND INFORMATION STORAGE MEDIUM

(75) Inventor: Ryuji Sakamaki, Tokyo (JP)

(73) Assignee: RAKUTEN, INC., Tokyo (JP)

( * ) Notice: Subject to any disclaimer, the term of this patent is extended or adjusted under 35 U.S.C. 154(b) by 335 days.

(21) Appl. No.: 14/357,206

(22) PCT Filed: Jul. 30, 2012

(86) PCT No.: PCT/JP2012/069337
§ 371 (c)(1),
(2), (4) Date: May 8, 2014

(87) PCT Pub. No.: WO2013/069344
PCT Pub. Date: May 16, 2013

(65) Prior Publication Data
US 2015/0010206 A1 Jan. 8, 2015

(30) Foreign Application Priority Data

Nov. 9, 2011 (JP) ................................. 2011-245279

(51) Int. Cl.
*G06K 9/00* (2006.01)
*G06T 7/73* (2017.01)

(52) U.S. Cl.
CPC ..... *G06K 9/00604* (2013.01); *G06K 9/00248* (2013.01); *G06T 7/73* (2017.01); *G06T 2207/30201* (2013.01)

(58) Field of Classification Search
None
See application file for complete search history.

(56) References Cited

U.S. PATENT DOCUMENTS

| 7,742,623 B1 | 6/2010 | Moon et al. |
| 2002/0101506 A1* | 8/2002 | Suzuki ............... H04N 13/0207 348/51 |
| 2013/0054576 A1* | 2/2013 | Karmarkar ............. G06F 3/013 707/722 |

FOREIGN PATENT DOCUMENTS

| JP | 2004-213486 A | 7/2004 |
| JP | 2005-100366 A | 4/2005 |

(Continued)

OTHER PUBLICATIONS

Andreas Sippl et al: "Real-Time Gaze Tracking for Public Displays". Nov. 10, 2010 (Nov. 10, 2010), Ambient Intelligence, Springer Berlin Heidelberg, Berlin, Heidelberg, p. 167-176, XP019156826.

(Continued)

*Primary Examiner* — Sean Conner
(74) *Attorney, Agent, or Firm* — Hubbs, Enatsky & Inoue PLLC

(57) ABSTRACT

A photographing unit photographs a face of the user who is looking at a screen displayed on a display unit. An area detecting unit detects, from the photographed image of the photographing unit, an eye area of the user and at least one of a face area of the user or a predetermined part area of the user other than the user's eyes. An areal size/position information obtaining unit obtains areal size information and position information of the eye area, and areal size information and position information of the at least one of the face area or the predetermined part area. A gaze position estimation unit estimates a position in the screen that the user is gazing at, based on the areal size information and the position information.

17 Claims, 15 Drawing Sheets

(56) References Cited

FOREIGN PATENT DOCUMENTS

| JP | 2006-293786 A | 10/2006 |
|---|---|---|
| JP | 2009-237624 A | 10/2009 |
| JP | 2010-134490 A | 6/2010 |
| JP | 2011-090702 A | 5/2011 |

OTHER PUBLICATIONS

Jong-Gook Ko et al: "Facial Feature Detection and Head Orientation based Gaze Tracking", Nov. 1, 2005 (Nov. 1, 2005), XP55202830, Retrieved from the Internet: URL: http://www.wseas.us/e-library/conferences/2005venice/papers/508-286.pdf [retrieved on Jul. 16, 2015].

You Jin Ko et al: "Gaze tracking based on active appearance model and multiple support vector regression on mobile devices", Optical Engineering, vol. 48, No. 7, Jul. 1, 2009 (Jul. 1, 2009), p. 077002, XP055203049.

Yusuke Sugano et al: "An Incremental Learning Method for Unconstrained Gaze Estimation", Oct. 12, 2008 (Oct. 12, 2008), Computer Vision—ECCV 2008; [Lecture Notes in Computer Science], Springer Berlin Heidelberg, Berlin, Heidelberg, p. 656-667, XP019109293.

Diako Mardanbegi et al: "Mobile gaze-based screen interaction in 3D environments", Proceedings of the 1st conference on novel gaze-controlled applications, NGCA '11, May 26, 2011, pp. 14, XP55240453, New York, New York, USA.

Christophe Collet:"CapRe:a gaze tracking system in man-machine interaction", Sep. 15, 1997, XP055203167.

Zhiwei Zhu et al: "Eye and gaze tracking for interactive graphic display", Machine vision and applications, Springer, Berlin, DE, vol. 15, No. 3, Jun. 8, 2004, pp. 139-148, XP002719847.

Hennessey C et al: "Noncontact Binocular Eye-Gaze Tracking for Point-of-Gaze Estimation in Three Dimensions", IEEE Transactions on Biomedical Engineering, IEEE Service Center, Piscataway, NJ, USA, vol. 56, No. 3, Mar. 1, 2009,pp. 790-799, XP011342862.

International Search Report for PCT/JP2012/069337 dated Oct. 30, 2012.

English Translation of Written Opinion of the International Searching Authority for PCT/JP2012/069337 accompanied with PCT/IB/373 and PCT/IB/338 dated May 22, 2014, acting as concise explanation of previously submitted reference(s).

T. Horprasert et al: "Computing 3-D head orientation from a monocular image sequence", Oct. 14, 1996, XP010200427.

Office Action of Jan. 4, 2017 for corresponding EP application No. 12847350.1.

* cited by examiner

|  | REFERENCE AREAL SIZE | REFERENCE X-COORDINATE | REFERENCE Y-COORDINATE |
|---|---|---|---|
| FACE AREA | --- | --- | --- |
| LEFT AND RIGHT EYES AREA | --- | --- | --- |
| LEFT EYE AREA | --- | --- | --- |
| RIGHT EYE AREA | --- | --- | --- |
| NOSE AREA | --- | --- | --- |
| MOUTH AREA | --- | --- | --- |

FIG.13

$z_1 = L_{1\_1} * d_1 + L_{1\_2} * d_2 + L_{1\_3} * d_3 + L_{1\_4} * d_4 + L_{1\_5} * d_5 + L_{1\_6} * d_6$
$\quad + L_{1\_7} * d_7 + L_{1\_8} * d_8 + L_{1\_9} * d_9 + L_{1\_10} * d_{10} + L_{1\_11} * d_{11} + L_{1\_12} * d_{12}$
$\quad + L_{1\_13} * d_{13} + L_{1\_14} * d_{14} + L_{1\_15} * d_{15} + L_{1\_16} * d_{16} + L_{1\_17} * d_{17} + L_{1\_18} * d_{18}$ $z_2 = L_{2\_1} * d_1 + L_{2\_2} * d_2 + L_{2\_3} * d_3 + L_{2\_4} * d_4 + L_{2\_5} * d_5 + L_{2\_6} * d_6$
$\quad + L_{2\_7} * d_7 + L_{2\_8} * d_8 + L_{2\_9} * d_9 + L_{2\_10} * d_{10} + L_{2\_11} * d_{11} + L_{2\_12} * d_{12}$
$\quad + L_{2\_13} * d_{13} + L_{2\_14} * d_{14} + L_{2\_15} * d_{15} + L_{2\_16} * d_{16} + L_{2\_17} * d_{17} + L_{2\_18} * d_{18}$ $z_3 = L_{3\_1} * d_1 + L_{3\_2} * d_2 + L_{3\_3} * d_3 + L_{3\_4} * d_4 + L_{3\_5} * d_5 + L_{3\_6} * d_6$
$\quad + L_{3\_7} * d_7 + L_{3\_8} * d_8 + L_{3\_9} * d_9 + L_{3\_10} * d_{10} + L_{3\_11} * d_{11} + L_{3\_12} * d_{12}$
$\quad + L_{3\_13} * d_{13} + L_{3\_14} * d_{14} + L_{3\_15} * d_{15} + L_{3\_16} * d_{16} + L_{3\_17} * d_{17} + L_{3\_18} * d_{18}$

...

$z_i = L_{i\_1} * d_1 + L_{i\_2} * d_2 + L_{i\_3} * d_3 + L_{i\_4} * d_4 + L_{i\_5} * d_5 + L_{i\_6} * d_6$
$\quad + L_{i\_7} * d_7 + L_{i\_8} * d_8 + L_{i\_9} * d_9 + L_{i\_10} * d_{10} + L_{i\_11} * d_{11} + L_{i\_12} * d_{12}$
$\quad + L_{i\_13} * d_{13} + L_{i\_14} * d_{14} + L_{i\_15} * d_{15} + L_{i\_16} * d_{16} + L_{i\_17} * d_{17} + L_{i\_18} * d_{18}$

...

$z_{16} = L_{16\_1} * d_1 + L_{16\_2} * d_2 + L_{16\_3} * d_3 + L_{16\_4} * d_4 + L_{16\_5} * d_5 + L_{16\_6} * d_6$
$\quad + L_{16\_7} * d_7 + L_{16\_8} * d_8 + L_{16\_9} * d_9 + L_{16\_10} * d_{10} + L_{16\_11} * d_{11} + L_{16\_12} * d_{12}$
$\quad + L_{16\_13} * d_{13} + L_{16\_14} * d_{14} + L_{16\_15} * d_{15} + L_{16\_16} * d_{16} + L_{16\_17} * d_{17} + L_{16\_18} * d_{18}$ $z_{17} = L_{17\_1} * d_1 + L_{17\_2} * d_2 + L_{17\_3} * d_3 + L_{17\_4} * d_4 + L_{17\_5} * d_5 + L_{17\_6} * d_6$
$\quad + L_{17\_7} * d_7 + L_{17\_8} * d_8 + L_{17\_9} * d_9 + L_{17\_10} * d_{10} + L_{17\_11} * d_{11} + L_{17\_12} * d_{12}$
$\quad + L_{17\_13} * d_{13} + L_{17\_14} * d_{14} + L_{17\_15} * d_{15} + L_{17\_16} * d_{16} + L_{17\_17} * d_{17} + L_{17\_18} * d_{18}$ $z_{18} = L_{18\_1} * d_1 + L_{18\_2} * d_2 + L_{18\_3} * d_3 + L_{18\_4} * d_4 + L_{18\_5} * d_5 + L_{18\_6} * d_6$
$\quad + L_{18\_7} * d_7 + L_{18\_8} * d_8 + L_{18\_9} * d_9 + L_{18\_10} * d_{10} + L_{18\_11} * d_{11} + L_{18\_12} * d_{12}$
$\quad + L_{18\_13} * d_{13} + L_{18\_14} * d_{14} + L_{18\_15} * d_{15} + L_{18\_16} * d_{16} + L_{18\_17} * d_{17} + L_{18\_18} * d_{18}$

FIG.14

$Gx = P + Q_1 * z_1 + Q_2 * z_2 + Q_3 * z_3 + Q_4 * z_4 + Q_5 * z_5 + Q_6 * z_6$
$\quad + Q_7 * z_7 + Q_8 * z_8 + Q_9 * z_9 + Q_{10} * z_{10} + Q_{11} * z_{11} + Q_{12} * z_{12}$
$\quad + Q_{13} * z_{13} + Q_{14} * z_{14} + Q_{15} * z_{15} + Q_{16} * z_{16} + Q_{17} * z_{17} + Q_{18} * z_{18}$ $Gy = S + T_1 * z_1 + T_2 * z_2 + T_3 * z_3 + T_4 * z_4 + T_5 * z_5 + T_6 * z_6$
$\quad + T_7 * z_7 + T_8 * z_8 + T_9 * z_9 + T_{10} * z_{10} + T_{11} * z_{11} + T_{12} * z_{12}$
$\quad + T_{13} * z_{13} + T_{14} * z_{14} + T_{15} * z_{15} + T_{16} * z_{16} + T_{17} * z_{17} + T_{18} * z_{18}$

| PROCESSING PERFORMANCE INDEX VALUE (p) | EXECUTION INTERVAL |
|---|---|
| $0 < p \leq Pa$ | Ta |
| $Pa < p \leq Pb$ | Tb |
| $Pb < p$ | Tc |

| PROCESSING PERFORMANCE INDEX VALUE(p) | NUMBER |
|---|---|
| $0 < p \leq Pa$ | Na |
| $Pa < p \leq Pb$ | Nb |
| $Pb < p$ | Nc |

| SPECIFIED POSITION | FACE AREA | | | ... | MOUTH AREA | | |
|---|---|---|---|---|---|---|---|
| | AREAL SIZE | X-COORDINATE | Y-COORDINATE | ... | AREAL SIZE | X-COORDINATE | Y-COORDINATE |
| --- | --- | --- | --- | ... | --- | --- | --- |
| ... | ... | ... | ... | ... | ... | ... | ... |

GAZE POSITION ESTIMATION SYSTEM, CONTROL METHOD FOR GAZE POSITION ESTIMATION SYSTEM, GAZE POSITION ESTIMATION DEVICE, CONTROL METHOD FOR GAZE POSITION ESTIMATION DEVICE, PROGRAM, AND INFORMATION STORAGE MEDIUM

CROSS REFERENCE TO RELATED APPLICATIONS

This application is a National Stage of International Application No. PCT/JP2012/069337 filed Jul. 30, 2012, claiming priority based on Japanese Patent Application No. 2011-245279 filed on Nov. 9, 2011. The contents of each of the above documents are incorporated herein by reference in their entirety.

TECHNICAL FIELD

The present invention relates to a gaze position estimation system, a method of controlling a gaze position estimation system, a gaze position estimation device, a method of controlling a gaze position estimation device, a program, and an information storage medium.

BACKGROUND ART

A technology of estimating a gaze position of a user based on an image of the user's face that is photographed by a single camera has been proposed. Patent Literature 1, for instance, discloses that the center point of a user's iris is detected from an image photographed by a single camera, the projection position of the center of the user's eyeball is further estimated from the image, and the direction of the user's sight line is estimated based on the iris center position and the projection position of the eyeball center.

CITATION LIST

Patent Literature

Patent Literature 1: JP 2011-90702 A

SUMMARY OF INVENTION

Technical Problem

The technology described in Patent Literature 1, however, requires to detect the center point of the user's iris and to estimate the projection position of the center of the user's eyeball. As processing that imposes a heavy processing load needs to be executed in order to detect the center point of the user's iris and to estimate the projection position of the center of the user's eyeball, a processing load of the processing of estimating the gaze position of the user may be heavy in some cases.

The present invention has been made in view of the problem described above, and an object of the present invention is therefore to provide a gaze position estimation system, a method of controlling a gaze position estimation system, a gaze position estimation device, a method of controlling a gaze position estimation device, a program, and an information storage medium with which a gaze position of a user can be estimated without detecting the center point of an iris or estimating the projection position of the center of an eyeball.

Solution to Problem

In order to solve the above-mentioned problem, a gaze position estimation system according to one embodiment of the present invention includes: photographing means for photographing a face of a user who is looking at a screen displayed on display means; area detecting means for detecting, from a photographed image of the photographing means, an eye area of the user and at least one of a face area of the user or a predetermined part area of the user, the predetermined part area being an area of a predetermined part of the user other than eyes; areal size/position information obtaining means for obtaining areal size information and position information of the eye area, and areal size information and position information of the at least one of the face area or the predetermined part area; and gaze position estimation means for estimating a position in the screen that the user is gazing at, based on the areal size information and the position information that are obtained by the areal size/position information obtaining means.

Further, a method of controlling a gaze position estimation system according to one embodiment of the present invention includes: a step of obtaining a photographed image of photographing means for photographing a face of a user who is looking at a screen displayed on display means; an area detecting step of detecting, from the photographed image, an eye area of the user and at least one of a face area of the user or a predetermined part area of the user, the predetermined part area being an area of a predetermined part of the user other than eyes; an areal size/position information obtaining step of obtaining areal size information and position information of the eye area, and areal size information and position information of the at least one of the face area or the predetermined part area; and a gaze position estimation step of estimating a position in the screen that the user is gazing at, based on the areal size information and the position information that are obtained in the areal size/position information obtaining step.

Further, a gaze position estimation device according to one embodiment of the present invention includes: means for obtaining areal size information and position information for an eye area of a user and for at least one of a face area of the user or a predetermined part area of the user, the predetermined part area being an area of a predetermined part of the user other than eyes, the eye area and the at least one of the face area or the predetermined part area being detected from a photographed image of photographing means for photographing a face of the user who is looking at a screen displayed on display means; and gaze position estimation means for estimating a position in the screen that the user is gazing at, based on the areal size information and the position information.

Further, a method of controlling a gaze position estimation device according to one embodiment of the present invention includes: a step of obtaining areal size information and position information for an eye area of a user and for at least one of a face area of the user or a predetermined part area of the user, the predetermined part area being an area of a predetermined part of the user other than eyes, the eye area and the at least one of the face area or the predetermined part area being detected from a photographed image of photographing means for photographing a face of the user who is looking at a screen displayed on display means; and a gaze position estimation step of estimating a position in the screen that the user is gazing at, based on the areal size information and the position information.

Further, a program according to one embodiment of the present invention is a program for causing a computer to function as: means for obtaining areal size information and position information for an eye area of a user and for at least one of a face area of the user or a predetermined part area of the user, the predetermined part area being an area of a predetermined part of the user other than eyes, the eye area and the at least one of the face area or the predetermined part area being detected from a photographed image of photographing means for photographing a face of the user who is looking at a screen displayed on display means; and gaze position estimation means for estimating a position in the screen that the user is gazing at, based on the areal size information and the position information.

Further, a computer-readable information storage medium according to one embodiment of the present invention is a computer-readable information storage medium having recorded thereon a program for causing a computer to function as: means for obtaining areal size information and position information for an eye area of a user and for at least one of a face area of the user or a predetermined part area of the user, the predetermined part area being an area of a predetermined part of the user other than eyes, the eye area and the at least one of the face area or the predetermined part area being detected from a photographed image of photographing means for photographing a face of the user who is looking at a screen displayed on display means; and gaze position estimation means for estimating a position in the screen that the user is gazing at, based on the areal size information and the position information.

Further, in one embodiment of the present invention, the gaze position estimation system may further include reference areal size/position information obtaining means for obtaining reference areal size information and reference position information of the eye area, based on areal size information and position information of the eye area when the user is looking at a reference position in the screen, and for obtaining reference areal size information and reference position information of the at least one of the face area or the predetermined part area, based on areal size information and position information of the at least one of the face area or the predetermined part area when the user is looking at the reference position in the screen; and the gaze position estimation means may estimate the position in the screen that the user is gazing at, based on a difference between the areal size information and the position information that are obtained by the areal size/position information obtaining means and the reference areal size information and the reference position information that are obtained by the reference areal size/position information obtaining means.

Further, in one embodiment of the present invention, the gaze position estimation system may further include means for calculating a moving average for the difference between the areal size information and the position information that are obtained by the areal size/position information obtaining means and the reference areal size information and the reference position information that are obtained by the reference areal size/position information obtaining means; and the gaze position estimation means may estimate the position in the screen that the user is gazing at, based on the moving average.

Further, in one embodiment of the present invention, the gaze position estimation system may further include: means for determining whether or not the detection by the area detecting means has failed for any one of the areas; and means for inhibiting execution of the estimation by the gaze position estimation means in the case where the detection by the area detecting means has failed for any one of the areas.

Further, in one embodiment of the present invention, the gaze position estimation system may further include means for displaying, in the screen, an image that indicates the position in the screen that is estimated by the gaze position estimation means that the user is gazing at.

Further, in one embodiment of the present invention, the gaze position estimation system may further include an information processing device; the information processing device may include the area detecting means, the areal size/position information obtaining means, and the gaze position estimation means; the photographing means may photographs the face of the user for every first predetermined period of time; of the photographed images photographed by the photographing means for every the first predetermined period of time, the photographed images for every second predetermined period of time longer than the first predetermined period of time may be set as targets of the detection by the area detecting means; and the gaze position estimation system may further include setting means for setting the second predetermined period of time based on information about processing performance of the information processing device.

Further, in one embodiment of the present invention, the gaze position estimation system may further include an information processing device; the information processing device may include the area detecting means, the areal size/position information obtaining means, and the gaze position estimation means; the gaze position estimation means may calculate the moving average for the difference between the areal size information and the position information that are obtained by the areal size/position information obtaining means and the reference areal size information and the reference position information that are obtained by the reference areal size/position information obtaining means, based on a predetermined number of most recent results obtained by the areal size/position information obtaining means; and the gaze position estimation system may include setting means for setting the predetermined number based on information about processing performance of the information processing device.

Further, in one embodiment of the present invention, the gaze position estimation means may estimate the position in the screen that the user is gazing at, by executing an operation according to one or more arithmetic expressions based on the areal size information and the position information that are obtained by the areal size/position information obtaining means; and the gaze position estimation system may further include: specified position obtaining means for obtaining a position in the screen that is specified by the user; and correction means for correcting one or more constants and/or one or more coefficients that are included in the one or more arithmetic expressions, based on the position in the screen that is specified by the user, areal size information and position information of the eye area when the position is specified by the user, and areal size information and position information of at least one of the face area or the predetermined part area when the position is specified by the user.

Further, in one embodiment of the present invention, the area detecting means may detect from the photographed image the face area of the user, a left and right eyes area of the user, a left eye area of the user, a right eye area of the user, a nose area of the user, and a mouth area of the user; and the areal size/position information obtaining means may obtain areal size information and position information of each of the face area, the left and right eyes area, the left eye area, the right eye area, the nose area, and the mouth area.

Further, in one embodiment of the present invention: the gaze position estimation system may further include: an information processing device which is connected to the photographing means; and a server device which is capable of communication to/from the information processing device; the information processing device may include means for transmitting the photographed image to the server device; and the server device may include the area detecting means, the areal size/position information obtaining means, and the gaze position estimation means.

Further, in one embodiment of the present invention, the gaze position estimation system may further include: an information processing device which is connected to the photographing means; and a server device which is capable of communication to/from the information processing device; the information processing device may include: the area detecting means; and means for transmitting a result of the detection by the area detecting means to the server device; and the server device may include the areal size/position information obtaining means and the gaze position estimation means.

Further, in one embodiment of the present invention, the gaze position estimation system may further include: an information processing device which is connected to the photographing means; and a server device which is capable of communication to/from the information processing device; the information processing device may include: the area detecting means; the areal size/position information obtaining means; and means for transmitting the areal size information and the position information that are obtained by the areal size/position information obtaining means to the server device; and the server device may include the gaze position estimation means.

Further, in one embodiment of the present invention: the gaze position estimation system may further include: an information processing device which is connected to the photographing means; and a server device which is capable of communication to/from the information processing device; the information processing device may include: the area detecting means; the areal size/position information obtaining means; the gaze position estimation means; and means for transmitting, to the server device, gaze position data related to a result of the estimation by the gaze position estimation means; and the server device may include: means for receiving the gaze position data; and means for executing totalization processing with regard to the position in the screen that the user is gazing at, based on the gaze position data.

Advantageous Effects of Invention

According to the present invention, a gaze position of a user can be estimated without, for example, detecting the center point of an iris or estimating the projection position of the center of an eyeball.

BRIEF DESCRIPTION OF DRAWINGS

FIG. 13 is a diagram illustrating arithmetic expressions for calculating a principal component score.

FIG. 14 is a diagram illustrating arithmetic expressions for calculating a gaze position of a user.

DESCRIPTION OF EMBODIMENTS

Examples of how the present invention is embodied are described in detail below with reference to the drawings.

First Embodiment

Figure 1:
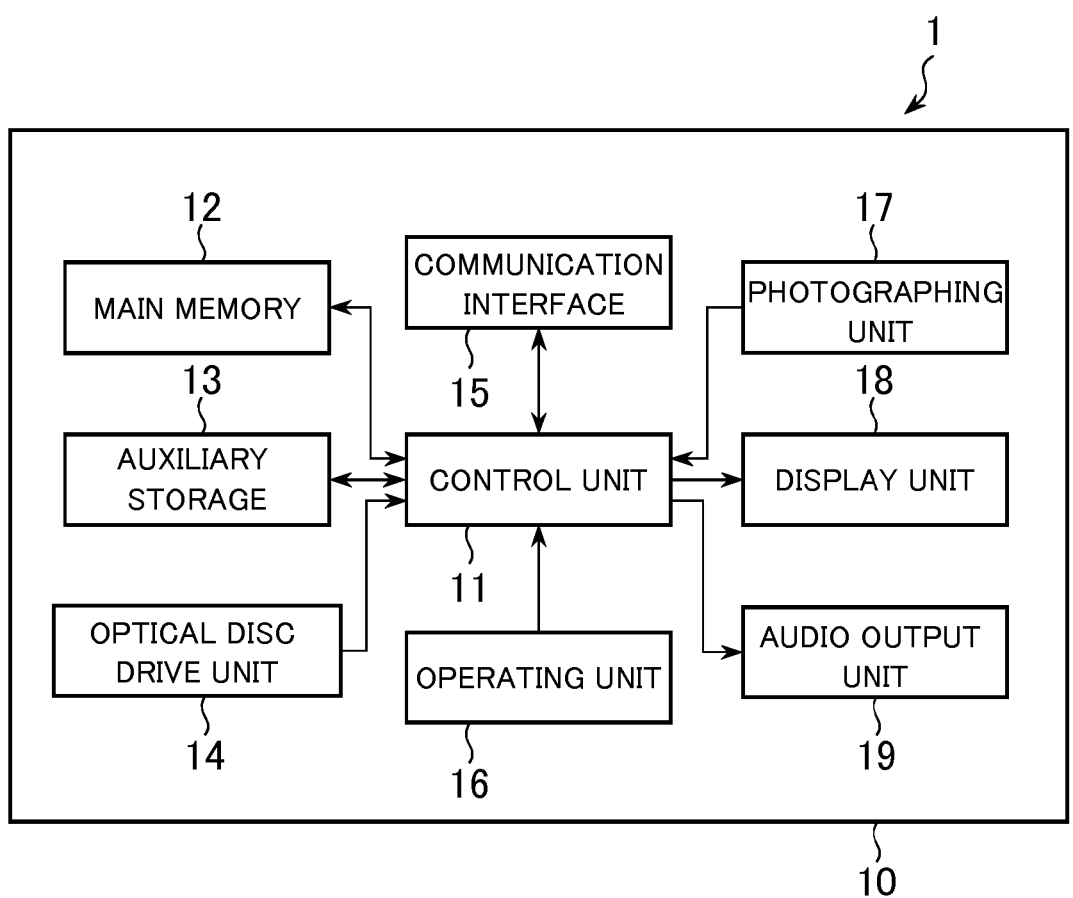
FIG. 1 is a diagram illustrating an example of the configuration of a gaze position estimation system according to an embodiment of the present invention.
Figure 2:
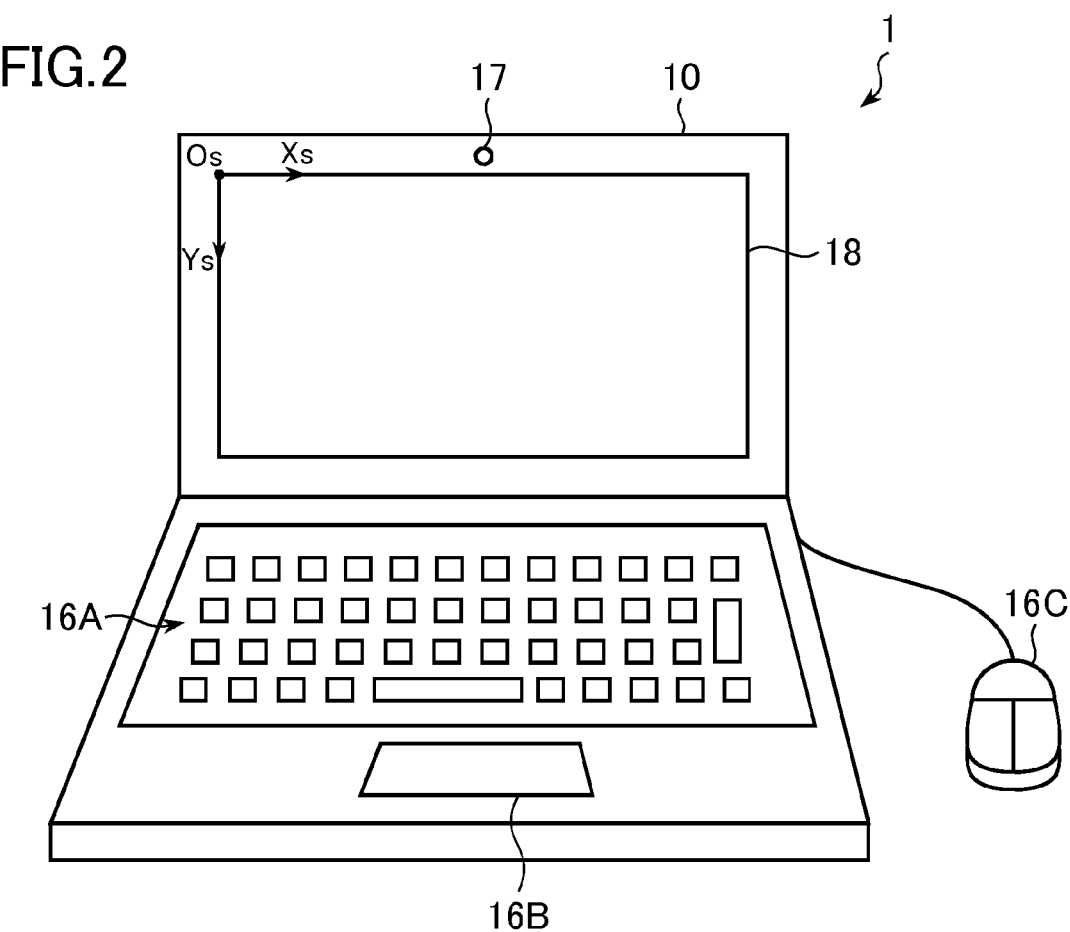
FIG. 2 is a diagram illustrating the external appearance of an information processing device.

A first embodiment of the present invention is described first. FIG. 1 illustrates the configuration of a gaze position estimation system according to the first embodiment of the present invention. As illustrated in FIG. 1, the gaze position estimation system 1 includes an information processing device 10 (a gaze position estimation device). FIG. 2 illustrates an example of the external appearance of the information processing device 10. The information processing device 10, which is shown as a laptop computer in FIG. 2, is not limited to a laptop computer. The information processing device 10 may instead be, for example, a desktop computer, a tablet computer, or a smart phone.

The information processing device 10 includes a control unit 11, a main memory 12, an auxiliary storage 13, an optical disc drive unit 14, a communication interface 15, an operating unit 16, a photographing unit 17, a display unit 18, and an audio output unit 19.

The control unit 11 includes, for example, one or more microprocessors, and executes information processing according to an operating system or a program that is stored in the auxiliary storage 13. The main memory 12 is, for example a RAM and the auxiliary storage 13 is, for example, a hard disk drive or a solid state drive. The optical disc drive unit 14 reads a program or data that is stored in an optical disc (information storage medium).

A program or data is supplied to the auxiliary storage 13 via an optical disc. Specifically, an optical disc storing a program or data is loaded into the optical disc drive unit 14, and a program or data is read from the optical disc by the optical disc drive unit 14 to be stored in the auxiliary storage 13. The optical disc drive unit 14 is not an indispensable component. A component for reading a program or data that is stored in other information storage media (for example, a memory card) than an optical disc may be included instead of the optical disc drive unit 14, so that a program or data is supplied to the auxiliary storage 13 via other information storage media than an optical disc.

The communication interface 15 is an interface for connecting the information processing device 10 to a communication network. The information processing device 10 can exchange data with other devices (for example, a server device) over a communication network. Programs and data may be supplied to the auxiliary storage 13 via the communication network.

The operating unit 16 is for a user to operate. The information processing device 10 in this embodiment includes, as the operating unit 16, a keyboard 16A, a touch pad 16B, and a mouse 16C. The touch pad 16B and the mouse 16C are pointing devices with which the user points to a position in a screen displayed on the display unit 18. The information processing device 10 may include a stick (lever), a touch panel that is overlaid on the display unit 18, or the like.

The photographing unit 17 includes a known digital camera. The photographing unit 17 is positioned in a place that allows the camera to photograph a face of a user who is looking at a screen displayed on the display unit 18. The photographing unit 17 is used to photograph the face of the user who is looking at the screen displayed on the display unit 18. In the example of FIG. 2, the photographing unit 17 is provided above the display unit 18 with a lens facing toward the user. The photographing unit 17 photographs at predetermined time intervals (e.g., for every 1/30 second). In other words, the photographing unit 17 photographs a video that has a predetermined frame number (e.g., 30) per second. The video photographed by the photographing unit 17 is saved in the auxiliary storage 13.

The display unit 18 is, for example, a liquid crystal display. The audio output unit 19 is, for example, a speaker or a headphone terminal. Various programs display various screens on the display unit 18.

When a Web browser is executed on the information processing device 10, for example, a processing request (HTTP request) is transmitted to a Web server device by the Web browser. The Web server device returns page data (an HTTP response) that is associated with the processing request to the information processing device 10, and a Web page (screen) is displayed on the display unit 18 based on the page data.

Figure 3:
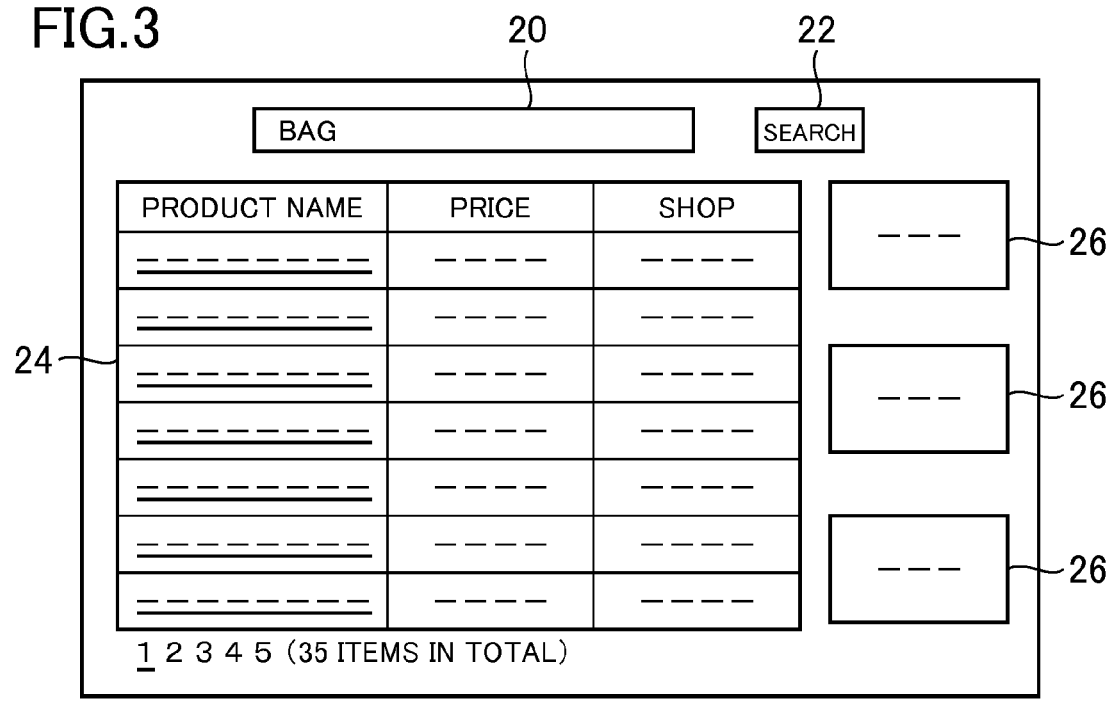
FIG. 3 is a diagram illustrating an example of a screen that is displayed on a display unit.

FIG. 3 illustrates an example of a screen that is displayed on the display unit 18. The example illustrated in FIG. 3 is of a Web page that is displayed when the information processing device 10 accesses an electronic commerce site (virtual shopping mall site) where a product or a service can be purchased via a communication network. Specifically, an example of a product list page that is displayed when "bag" is specified as a keyword is illustrated in FIG. 3.

The product list page includes, as illustrated in FIG. 3, a keyword field 20, a search button 22, and a list area 24. A keyword specified by the user is displayed in the keyword field 20. The keyword field 20 and the search button 22 are used to narrow down a product list.

A list of products that are related to the keyword specified by the user is displayed in the list area 24. For instance, the names and prices of products, and shops that sell the products are displayed in the list area 24. In the list area 24, a product name serves as a link button and is associated with information of a link (URL) to a product page for purchasing the product. When the user clicks the product name, its associated product page is displayed on the display unit 18.

An advertisement 26 of a shop or a product is also displayed in the product list page. The advertisement 26 serves as a link button and is associated with information of a link (URL) to a shop page or a product page. When the advertisement 26 is clicked, its associated shop page or product page is displayed on the display unit 18.

If there is a way to obtain information on which position in the screen (a product list page) the user is looking at while the product list page as the one illustrated in FIG. 3, for example, is being displayed on the display unit 18, the obtained information can be used as a basis in re-evaluating where to display information that is hoped to catch users' eye (e.g., the advertisement 26).

In this regard, the gaze position estimation system 1 estimates a position in the screen (in other words, a display area of the display unit 18) at which the user is gazing based on an image photographed by the photographing unit 17. More specifically, the gaze position estimation system 1 estimates a gaze position of the user based on the areal sizes and the positions of the user's eye area, face area, and part area other than the eyes in the photographed image. A configuration for estimating the gaze position of the user is described below in detail.

The gaze position estimation system 1 needs to execute initial setting prior to executing the estimation of the gaze position of the user. A configuration for initial setting is therefore described first.

Figure 4:
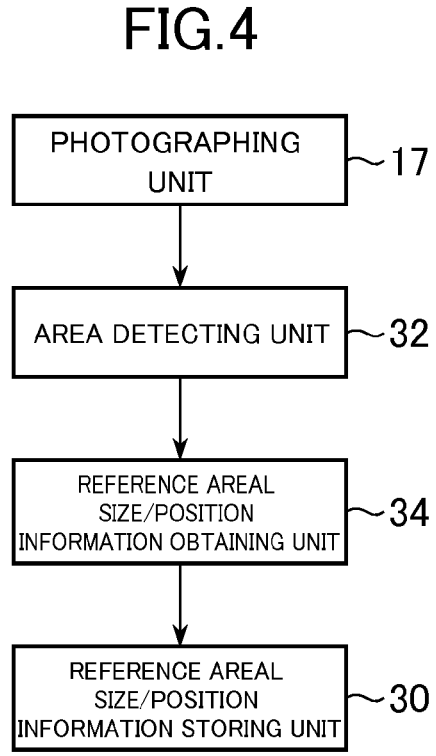
FIG. 4 is a function block diagram of the gaze position estimation system.

FIG. 4 is a function block diagram illustrating function blocks for initial setting out of function blocks that are implemented in the gaze position estimation system 1. As illustrated in FIG. 4, the gaze position estimation system 1 includes, as function blocks for initial setting, a reference areal size/position information storing unit 30, an area detecting unit 32, and a reference areal size/position information obtaining unit 34. The reference areal size/position information storing unit 30 is implemented by, for example, the auxiliary storage 13. The area detecting unit 32 and the reference areal size/position information obtaining unit 34 are implemented by, for example, the control unit 11. In other words, the control unit 11 executes processing according to a program, to thereby function as these function blocks.

Figure 5:
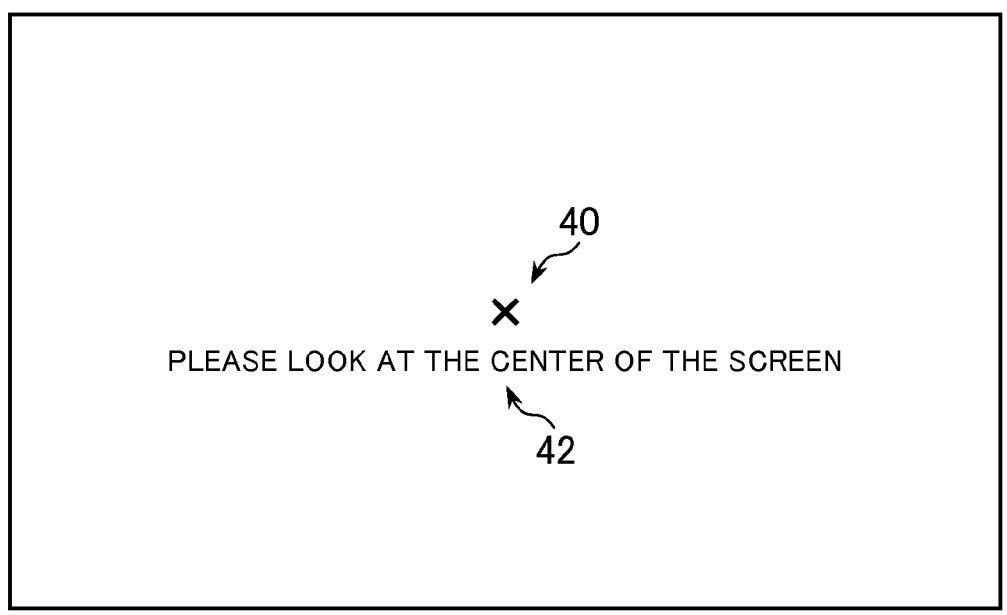
FIG. 5 is a diagram illustrating an example of an initial setting screen.

An initial setting screen is displayed on the display unit 18 when initial setting is conducted. FIG. 5 illustrates an example of the initial setting screen. A marker 40 and a message 42 are displayed the initial setting screen of FIG. 5. The marker 40 indicates a position in the screen at which the user is supposed to gaze. In the example of FIG. 5, the center point of the screen is set as the "position in the screen at which the user is supposed to gaze". Another position than the center position may be set as the "position in the screen at which the user is supposed to gaze". The contents of the message 42 is a request for the user to look at the position described above.

Figure 6:
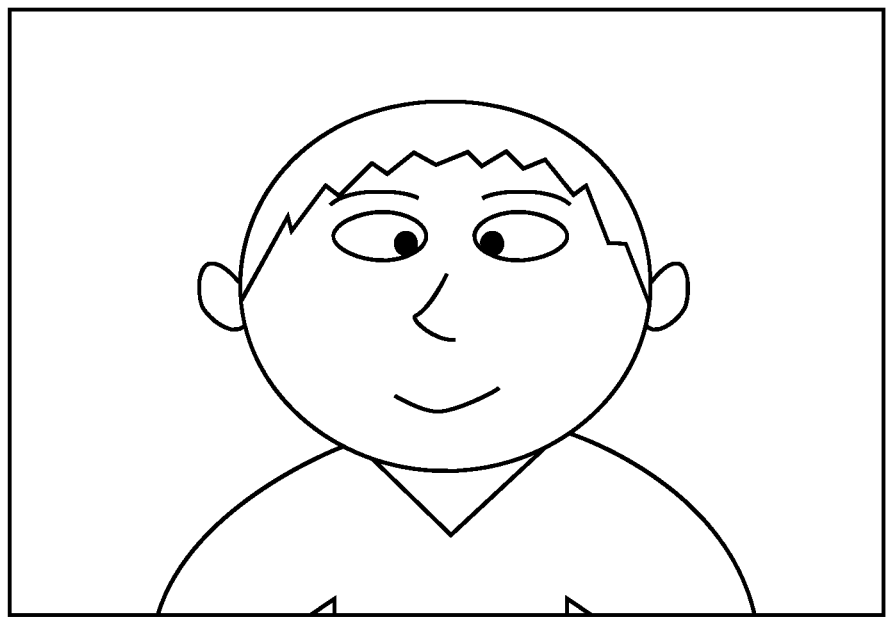
FIG. 6 is a schematic diagram illustrating an example of a photographed image of a photographing unit.

In initial setting, as the initial setting screen is displayed, an image of the face of the user looking at the center point of the screen is photographed by the photographing unit 17, and the image is saved in the auxiliary storage 13. FIG. 6 is a schematic diagram illustrating an example of a photographed image of the photographing unit 17.

Figure 7:
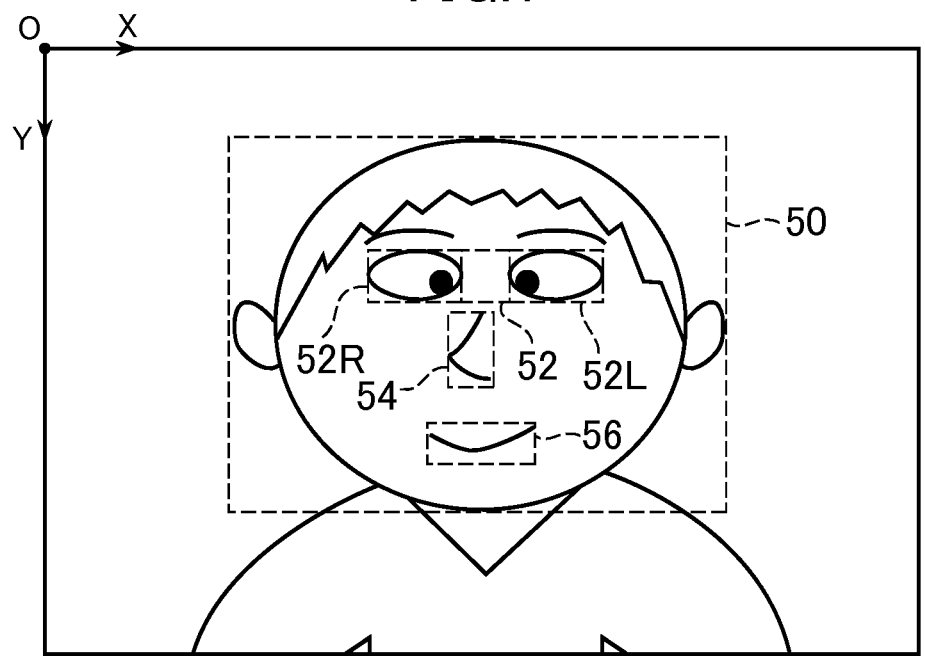
FIG. 7 is a diagram illustrating the operation of an area detecting unit.

The area detecting unit 32 is described. FIG. 7 is a diagram illustrating the operation of the area detecting unit 32.

The area detecting unit 32 detects from the photographed image an eye area which corresponds to the user's eyes. The "eye area" refers to, for example, at least one of a left and right eyes area 52, which corresponds to the user's left and right eyes, a left eye area 52L, which corresponds to the user's left eye, and a right eye area 52R, which corresponds to the user's right eye.

In an example illustrated in FIG. 7, the left and right eyes area 52 is a rectangular area that corresponds to the user's left and right eyes. The left eye area 52L is a rectangular area that corresponds to the user's left eye. The right eye area 52R is a rectangular area that corresponds to the user's right eye. The left and right eyes area 52, the left eye area 52L, and the right eye area 52R which are rectangular areas in the example of FIG. 7 may be areas having other shapes than a rectangular shape.

The area detecting unit 32 also detects from the photographed image at least one of a face area, which corresponds to the user's face, and a predetermined part area, which corresponds to a predetermined part out of the user's facial parts other than the eyes. The "predetermined part other than the eyes" is, for example, the nose, the mouth, or the ears.

In the example of FIG. 7, a face area 50 is a rectangular area that corresponds to the user's face. A nose area 54 is a rectangular area that corresponds to the user's nose, and a mouth area 56 is a rectangular area that corresponds to the user's mouth. At least one of the nose area 54 and the mouth area 56 corresponds to the "predetermined part area" described above in the example of FIG. 7. The face area 50, the nose area 54, and the mouth area 56 which are rectangular areas in the example of FIG. 7 may have other shapes than a rectangular shape.

In the following description, areas detected by the area detecting unit 32 are the face area 50, the left and right eyes area 52, the left eye area 52L, the right eye area 52R, the nose area 54, and the mouth area 56.

The area detecting unit 32 detects the face area 50, the left and right eyes area 52, the left eye area 52L, the right eye area 52R, the nose area 54, and the mouth area 56 based on a known image recognition algorithm. The "image recognition algorithm" employed is, for example, a face recognition algorithm that uses OpenCV.

The reference areal size/position information obtaining unit 34 is described. The reference areal size/position information obtaining unit 34 obtains reference areal size information and reference position information of the eye area. Specifically, the reference areal size/position information obtaining unit 34 obtains the reference areal size information and the reference position information of the eye area, based on areal size information and position information of the eye area that is detected from an image photographed when the user is looking at a reference position in the screen. In this embodiment, the "reference position" is the position that the user is requested to look at on the initial setting screen (for example, the center point).

The reference areal size/position information obtaining unit 34 also obtains reference areal size information and reference position information of at least one of the face area and the predetermined part area. Specifically, the reference areal size/position information obtaining unit 34 obtains the reference areal size information and the reference position information of the face area, based on areal size information and position information of the face area that is detected from an image photographed when the user is looking at the reference position in the screen. The reference areal size/position information obtaining unit 34 obtains the reference areal size information and the reference position information of the predetermined part area based on areal size information and position information of the predetermined part area that is detected from an image photographed when the user is looking at the reference position in the screen. The "predetermined part area" refers to, as described above, an area that corresponds to a predetermined part out of the user's facial parts other than the eyes.

The reference areal size/position information obtaining unit 34 in this embodiment obtains the following information:

(1) reference areal size of the face area 50
(2) a reference X-coordinate and a reference Y-coordinate of a representative point of the face area 50
(3) reference areal size of the left and right eyes area 52
(4) a reference X-coordinate and a reference Y-coordinate of a representative point of the left and right eyes area 52
(5) reference areal size of the left eye area 52L
(6) a reference X-coordinate and a reference Y-coordinate of a representative point of the left eye area 52L
(7) reference areal size of the right eye area 52R
(8) a reference X-coordinate and a reference Y-coordinate of a representative point of the right eye area 52R
(9) reference areal sizes of the nose area 54
(10) a reference X-coordinate and a reference Y-coordinate of a representative point of the nose area 54
(11) reference areal sizes of the mouth area 56
(12) a reference X-coordinate and a reference Y-coordinate of a representative point of the mouth area 56

A "representative point" is, for example, the center point of the area. In the case of a rectangular area, the "representative point" may be one of the vertices of the rectangular area (e.g., the upper left vertex). The position of a "representative point" is expressed by an X-Y coordinate system. The X-Y coordinate system is, for example, a coordinate system in which the upper left vertex of the photographed image is an origin O, the rightward direction is the positive direction of the X-axis, and the downward direction is the positive direction of the Y-axis (see FIG. 7).

The reference areal size/position information obtaining unit 34 obtains, for example, the reference areal size of the face area 50 based on the areal size of the face area 50 that is detected from an image photographed when the user is looking at the center point of the initial setting screen. For instance, the reference areal size/position information obtaining unit 34 obtains the areal size of the face area 50 that is detected from the image photographed when the user is looking at the center point of the initial setting screen, as the reference areal size of the face area 50. Alternatively, the reference areal size/position information obtaining unit 34 obtains a statistical value (e.g., average value) of the areal size of the face area 50 that is detected from each of a plurality of images photographed when the user is looking at the center point of the initial setting screen, as the reference areal size of the face area 50.

The reference areal size/position information obtaining unit 34 obtains the reference X-coordinate and the reference Y-coordinate of the face area 50 based on the X-coordinate and the Y-coordinate of a representative point of the face area 50 that is detected from an image photographed when the user is looking at the center point of the initial setting screen. For instance, the reference areal size/position information obtaining unit 34 obtains the X-coordinate and the Y-coordinate of a representative point of the face area 50 that is detected from an image photographed when the user is looking at the center point of the initial setting screen, as the reference X-coordinate and the reference Y-coordinate of the face area 50. Alternatively, the reference areal size/position information obtaining unit 34 obtains a statistical value (e.g., average value) of the X-coordinate of a representative point of the face area 50 that is detected from each of a plurality of images photographed when the user is looking at the center point of the initial setting screen, as the reference X-coordinate of the face area 50. The reference areal size/position information obtaining unit 34 obtains a statistical value (e.g., average value) of the Y-coordinate of the representative point of the face area 50 that is detected from each of the plurality of photographed images, as the reference Y-coordinate of the face area 50.

The reference areal size/position information obtaining unit 34 also obtains the reference areal sizes, reference X-coordinates, and reference Y-coordinates of other areas than the face area 50 in the same manner that is used for the face area 50.

Figures 8, 9:
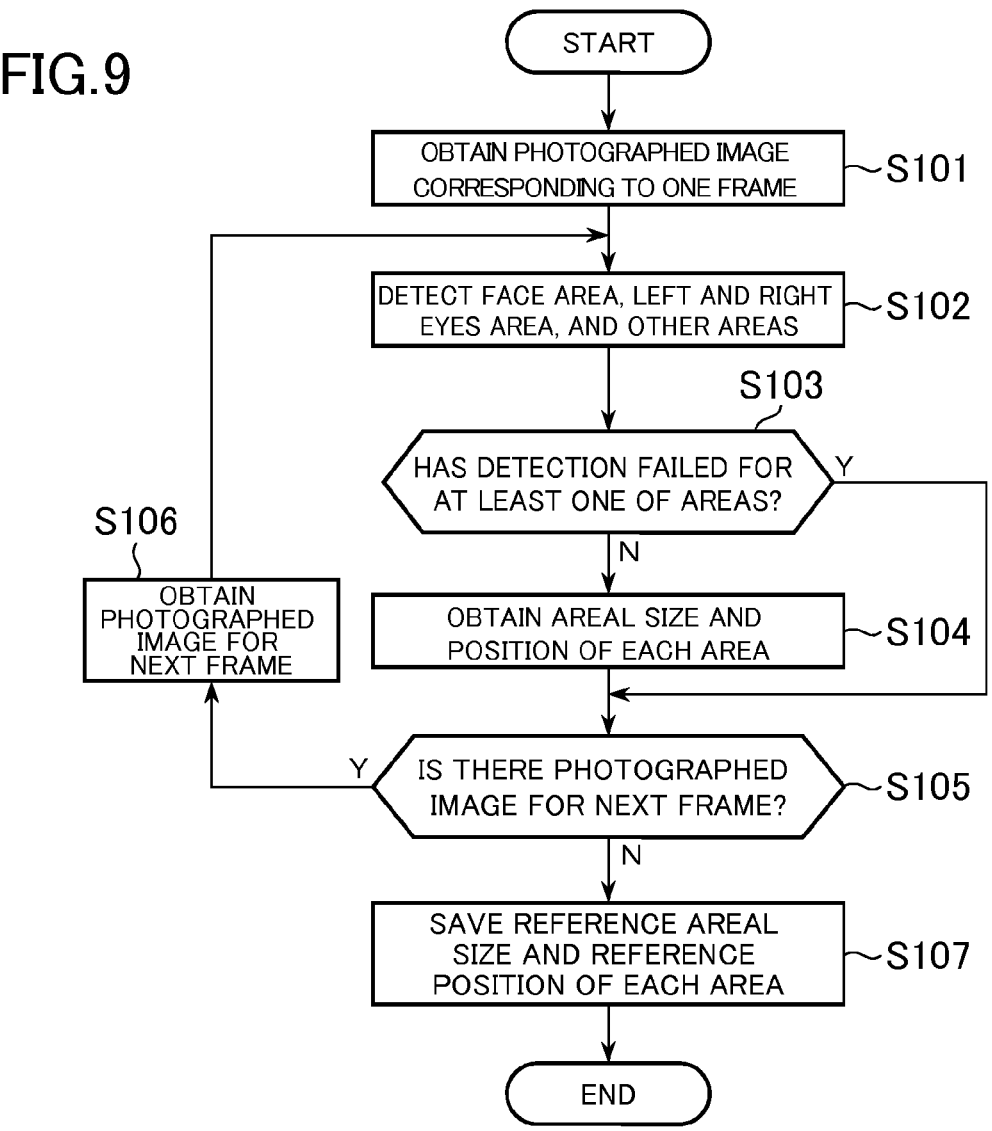
FIG. 8 is a diagram illustrating an example of what is stored in a reference areal size/position information storing unit.
FIG. 9 is a flow chart illustrating an example of processing that is executed in the gaze position estimation system.

The reference areal size/position information storing unit 30 stores the reference areal size information and the reference position information obtained by the reference areal size/position information obtaining unit 34. FIG. 8 illustrates an example of what is stored in the reference areal size/position information storing unit 30. As illustrated in FIG. 8, the reference areal size/position information storing unit 30 stores the reference areal size, the reference X-coordinate, and the reference Y-coordinate of each of the face area 50, the left and right eyes area 52, the left eye area 52L, the right eye area 52R, the nose area 54, and the mouth area 56.

Now a description is given on processing that is executed in the gaze position estimation system 1 in order to implement the area detecting unit 32 and the reference areal size/position information obtaining unit 34 which have been described above. FIG. 9 is a flow chart illustrating an example of this processing. The control unit 11 executes the processing of FIG. 9 according to a program, thereby functioning as the area detecting unit 32 and the reference areal size/position information obtaining unit 34.

The processing of FIG. 9 is executed ex post facto after the initial setting screen has been displayed for a predetermined period of time. The processing of FIG. 9 is executed based on video data saved in the auxiliary storage 13 (video data obtained by photographing the face of the user looking at the center point in the initial setting screen).

As illustrated in FIG. 9, the control unit 11 obtains a photographed image corresponding to one frame from the video data (S101). It takes a certain period of time for the user to recognize the message 42 and gaze at the center point (marker 40) of the initial setting screen after the initial setting screen is first displayed. The control unit 11 therefore ignores images photographed within this period and obtains an image photographed after the period.

Thereafter, the control unit 11 detects the face area 50, the left and right eyes area 52, the left eye area 52L, the right eye area 52R, the nose area 54, and the mouth area 56 in the photographed image (S102). The control unit 11 detects these areas based on, for example, a face recognition algorithm that uses OpenCV.

The control unit 11 determines whether or not the detection has failed for at least one of the areas (S103). When it is not determined that the detection has failed for at least one of the areas, in other words, when the detection has succeeded for all of the areas, the control unit 11 obtains areal size information and position information of each area detected in Step S102 (S104). Specifically, the control unit 11 obtains, for each area detected in Step S102, the areal size of the detected area and the X-coordinate and the Y-coordinate of the representative point (e.g., the center point) of the detected area. The control unit 11 stores the areal size information and the position information of each area detected in Step S102 in the auxiliary storage 13.

The control unit 11 then determines whether or not there is a photographed image for the next frame (S105). When there is the photographed image for the next frame, the control unit 11 obtains the photographed image for the next frame from the video data (S106). The control unit 11 subsequently executes Step S102 again.

On the other hand, when there is no photographed image for the next frame, in other words, when the photographed image of the current frame is an image of the last frame in the video data, the control unit 11 saves reference areal size information and reference position information of each of the face area 50, the left and right eyes area 52, the left eye area 52L, the right eye area 52R, the nose area 54, and the mouth area 56 in the auxiliary storage 13 (reference areal size/position information storing unit 30) (S107).

For instance, the control unit 11 saves, as reference areal size of the left and right eyes area 52, a statistical value (e.g., average value) of the areal size of the left and right eyes area 52 that is detected from the photographed image of each frame. The control unit 11 similarly saves, as the reference X-coordinate of the left and right eyes area 52, a statistical value (e.g., average value) of X-coordinate of the representative point of the left and right eyes area 52 that is detected from the photographed image of each frame. The control unit 11 also saves, as the reference Y-coordinate of the left and right eyes area 52, a statistical value (e.g., average value) of Y-coordinates of the representative point of the left and right eyes area 52 that is detected from the photographed image of each frame. The control unit 11 obtains the reference areal sizes, the reference X-coordinates, and the reference Y-coordinates of other areas than the left and right eyes area 52 in the same manner that is used for the left and right eyes area 52.

When it is determined in Step S103 that the detection has failed for at least one of the areas, the control unit 11 executes Step S105 without executing Step S104. In other words, when the detection fails for at least one of the areas, a photograph image of that frame is ignored in the processing of FIG. 9.

As described, in initial setting, the reference areal size information and the reference position information of the face area 50 and other areas are saved in the auxiliary storage 13 (reference areal size/position information storing unit 30), based on the areal size information and the position information of the face area 50 and other areas when the user is looking at the center point of the initial setting screen. This concludes the description on initial setting. A configuration for estimating the gaze position of the user is described next.

Figure 10:
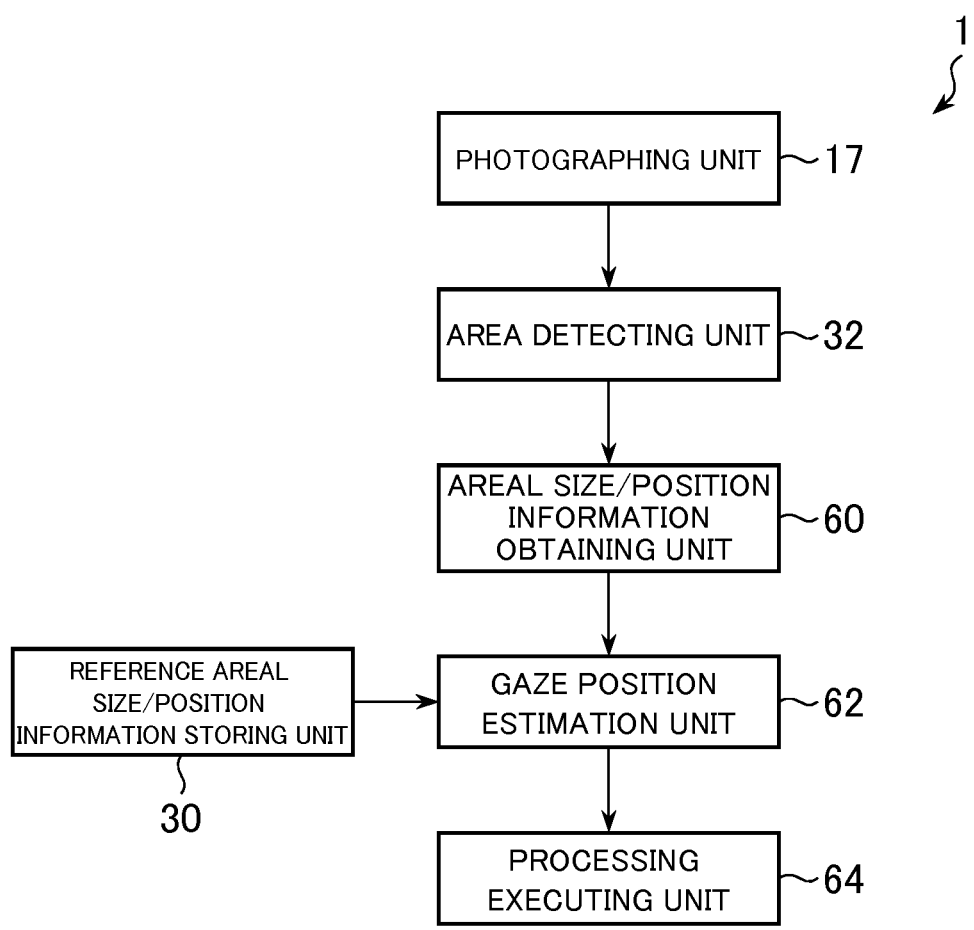
FIG. 10 is a function block diagram of the gaze position estimation system.

FIG. 10 is a function block diagram illustrating function blocks for estimating the gaze position of the user out of function blocks that are implemented in the gaze position estimation system 1. As illustrated in FIG. 10, the gaze position estimation system 1 includes, as function blocks for estimating the gaze position of the user, the reference areal size/position information storing unit 30, the area detecting unit 32, an areal size/position information obtaining unit 60, a gaze position estimation unit 62, and a processing executing unit 64. The reference areal size/position information storing unit 30 and the area detecting unit 32 are the same as the reference areal size/position information storing unit 30 and the area detecting unit 32 in FIG. 4. The areal size/position information obtaining unit 60, the gaze position estimation unit 62, and the processing executing unit 64 are implemented by, for example, the control unit 11. In other words, the control unit 11 executes processing according to a program, to thereby function as these function blocks.

For example, in the case of estimating the gaze position of the user in a period where the product list page is displayed, the area detecting unit 32, the areal size/position information obtaining unit 60, and the gaze position estimation unit 62 operate based on video data photographed by the photographing unit 17 during the period where the product list page is displayed.

The area detecting unit 32 is described. As described above, the area detecting unit 32 detects the eye area which corresponds to the user's eye from the photographed image. The area detecting unit 32 also detects from the photographed image at least one of the face area, which corresponds to the user's face, and the predetermined part area, which corresponds to a predetermined part out of the user's facial parts other than the eyes.

In this embodiment, the area detecting unit 32 detects the face area 50, the left and right eyes area 52, the left eye area 52L, the right eye area 52R, the nose area 54, and the mouth area 56.

The areal size/position information obtaining unit 60 is described. The areal size/position information obtaining unit 60 obtains areal size information and position information for each area detected by the area detecting unit 32. For instance, the areal size/position information obtaining unit 60 obtains areal size information and position information of the eye area. The areal size/position information obtaining unit 60 also obtains areal size information and position information of at least one of the face area and the predetermined part area.

In this embodiment, the areal size/position information obtaining unit 60 obtains the following information:
(1) areal size of the face area 50
(2) an X-coordinate and a Y-coordinate of a representative point of the face area 50
(3) areal size of the left and right eyes area 52
(4) an X-coordinate and a Y-coordinate of a representative point of the left and right eyes area 52
(5) areal size of the left eye area 52L
(6) an X-coordinate and a Y-coordinate of a representative point of the left eye area 52L
(7) areal size of the right eye area 52R
(8) an X-coordinate and a Y-coordinate of a representative point of the right eye area 52R
(9) areal size of the nose area 54
(10) an X-coordinate and a Y-coordinate of a representative point of the nose area 54
(11) areal size of the mouth area 56
(12) an X-coordinate and a Y-coordinate of a representative point of the mouth area 56

The "representative point" is, for example, the center point of the area. In the case of a rectangular area, the "representative point" may be one of the vertices of the rectangular area (e.g., the upper left vertex). The position of the "representative point" in each area is expressed by an X-Y coordinate system (see FIG. 7).

The gaze position estimation unit 62 is described. The gaze position estimation unit 62 estimates a position in the screen at which the user is gazing, based on the areal size information and the position information of the respective areas that are obtained by the areal size/position information obtaining unit 60.

For instance, the gaze position estimation unit 62 estimates the gaze position of the user, based on a difference between the areal size information and the position information of the respective areas that are obtained by the areal size/position information obtaining unit 60 and the reference areal size information and the reference position information of the respective areas that are stored in the reference areal size/position information storing unit 30. Based on this difference, the gaze position estimation unit 62 estimates the gaze position of the user by, for example, executing an operation according to one or more arithmetic expressions. Details of the operation of the gaze position estimation unit 62 are described later (see Steps S205 to S210 of FIGS. 11 and 12 described later).

The processing executing unit 64 is described. The processing executing unit 64 executes predetermined processing based on the gaze position of the user that is estimated by the gaze position estimation unit 62. The "predetermined processing" refers to, for example, totalization processing regarding the gaze position of the user, processing of generating distribution data which indicates the distribution of the gaze position of the user, or the like.

Figure 11:
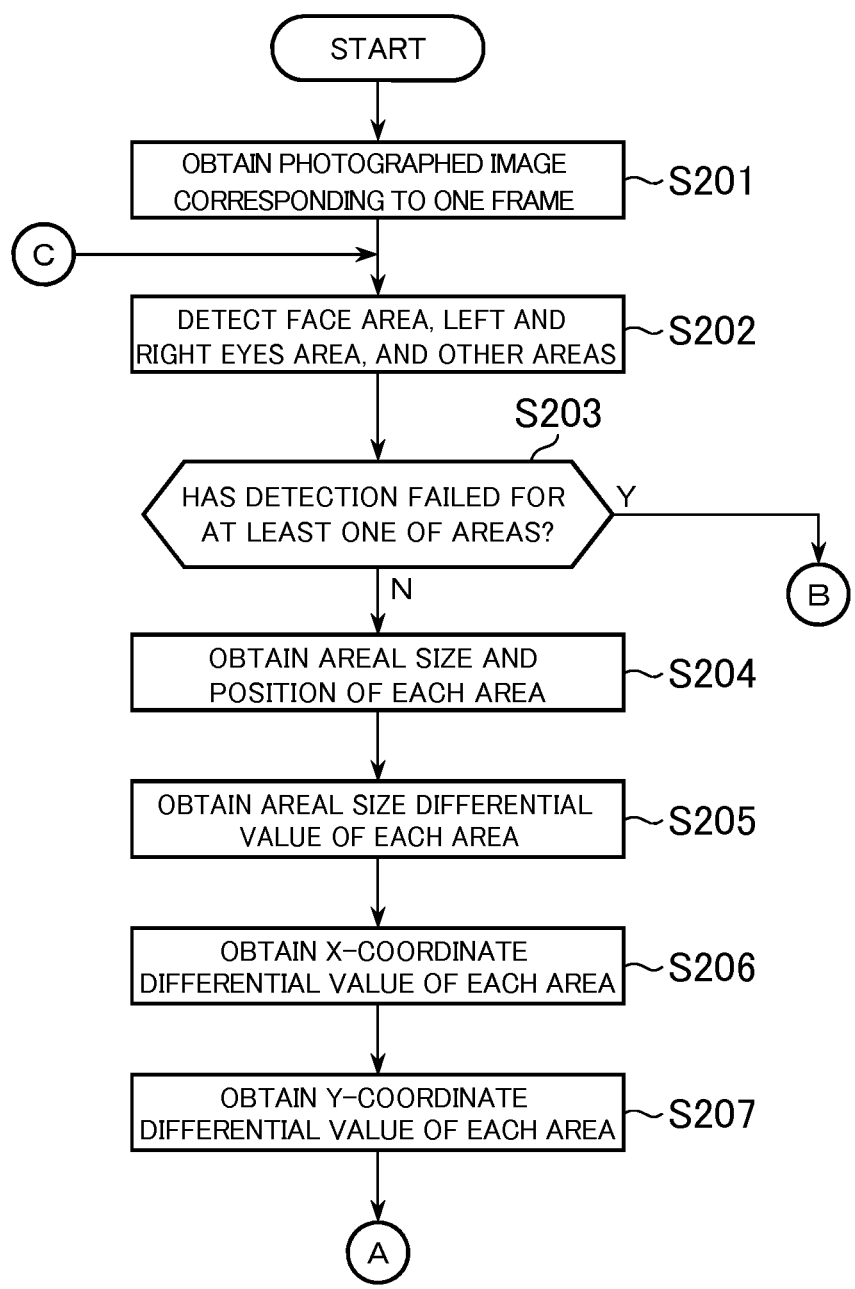
FIG. 11 is a flow chart illustrating an example of processing that is executed in the gaze position estimation system.
Figure 12:
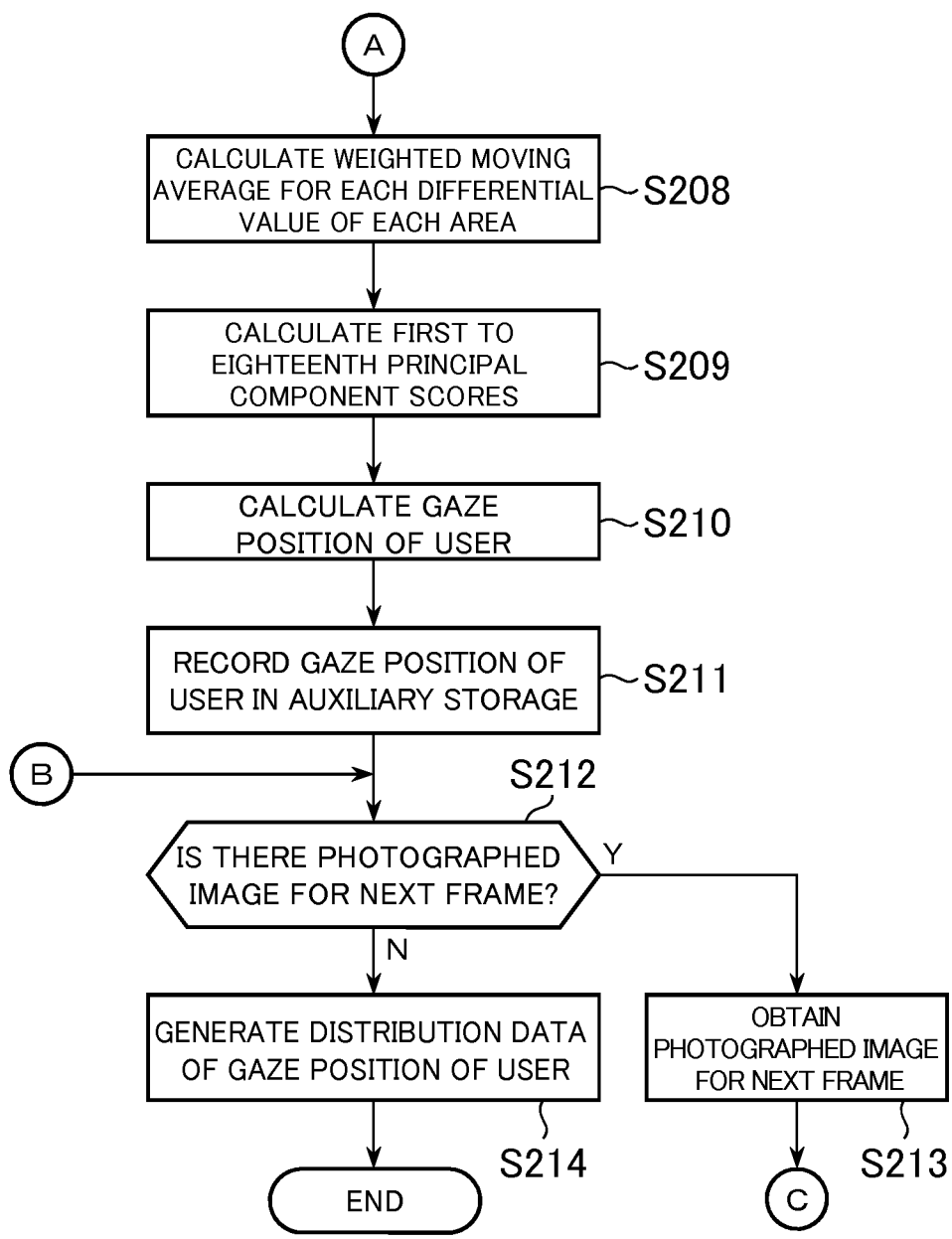
FIG. 12 is a flow chart illustrating an example of processing that is executed in the gaze position estimation system.

A description is given on processing that is executed in the gaze position estimation system 1 in order to implement the area detecting unit 32, the areal size/position information obtaining unit 60, the gaze position estimation unit 62, and the processing executing unit 64 which have been described. FIGS. 11 and 12 are flowcharts illustrating an example of this processing. The control unit 11 executes the processing of FIGS. 11 and 12 according to a program, thereby functioning as the area detecting unit 32, the areal size/position information obtaining unit 60, the gaze position estimation unit 62, and the processing executing unit 64.

The processing of FIGS. 11 and 12 is executed based on video data saved in the auxiliary storage 13 in advance (for example, video data of the user's face that is photographed while the product list page is displayed).

As illustrated in FIG. 11, the control unit 11 first obtains a photographed image corresponding to one frame from the video data (S201). The control unit 11 then detects the face area 50, the left and right eyes area 52, the left eye area 52L, the right eye area 52R, the nose area 54, and the mouth area 56 in the photographed image (S202). The control unit 11 detects these areas based on, for example, a face recognition algorithm that uses OpenCV.

The control unit 11 determines whether or not the detection has failed for at least one of the areas (S203). When it is not determined that the detection has failed for at least one of the areas, in other words, when the detection has succeeded for all of the areas, the control unit 11 obtains the areal size information and the position information of each area detected in Step S202 (S204). Specifically, the control unit 11 obtains, for each area detected in Step S202, the areal size of the detected area and the X-coordinate and the Y-coordinate of the representative point (e.g., the center point) of the detected area.

Thereafter, the control unit 11 calculates an areal size differential value ($\Delta S$) for each area detected in Step S202 (S205). The areal size differential value ($\Delta S$) is a differential value between the areal size obtained in Step S204 and the reference areal size. For instance, the control unit 11 calculates the areal size differential value ($\Delta S$) of the face area 50 by subtracting the reference areal size of the face area 50 which is stored in the auxiliary storage 13 from the areal size of the face area 50 that is obtained in Step S204. The control unit 11 calculates the areal size differential values ($\Delta S$) of other areas than the face area 50 in the same manner that is used for the face area 50.

The control unit 11 also calculates an X-coordinate differential value ($\Delta X$) for each area detected in Step S202 (S206). The X-coordinate differential value ($\Delta X$) is a differential value between the X-coordinate obtained in Step S204 and the reference X coordinate. For instance, the control unit 11 calculates the X-coordinate differential value ($\Delta X$) of the face area 50 by subtracting the reference X-coordinate of the face area 50 which is stored in the auxiliary storage 13 from the X-coordinate of the face area 50 that is obtained in Step S204. The control unit 11 calculates the X-coordinate differential values ($\Delta X$) of other areas than the face area 50 in the same manner that is used for the face area 50.

The control unit 11 further calculates a Y-coordinate differential value ($\Delta Y$) for each area detected in Step S202 (S207). The Y-coordinate differential value ($\Delta Y$) is a differential value between the Y-coordinate obtained in Step S204 and the reference Y coordinate. For instance, the control unit 11 calculates the Y-coordinate differential value ($\Delta Y$) of the face area 50 by subtracting the reference Y-coordinate of the face area 50 which is stored in the auxiliary storage 13 from the Y-coordinate of the face area 50 that is obtained in Step S204. The control unit 11 calculates the Y-coordinate differential values ($\Delta Y$) of other areas than the face area 50 in the same manner that is used for the face area 50.

Through Steps S205 to S207 described above, the following eighteen differential values are obtained:

(1) the areal size differential value ($\Delta S$) of the face area 50
(2) the X-coordinate differential value ($\Delta X$) of the face area 50
(3) the Y-coordinate differential value ($\Delta Y$) of the face area 50
(4) the areal size differential value ($\Delta S$) of the left and right eyes area 52
(5) the X-coordinate differential value ($\Delta X$) of the left and right eyes area 52
(6) the Y-coordinate differential value ($\Delta Y$) of the left and right eyes area 52
(7) the areal size differential value ($\Delta S$) of the left eye area 52L
(8) the X-coordinate differential value ($\Delta X$) of the left eye area 52L
(9) the Y-coordinate differential value ($\Delta Y$) of the left eye area 52L
(10) the areal size differential value ($\Delta S$) of the right eye area 52R
(11) the X-coordinate differential value ($\Delta X$) of the right eye area 52R
(12) the Y-coordinate differential value ($\Delta Y$) of the right eye area 52R
(13) the areal size differential value ($\Delta S$) of the nose area 54
(14) the X-coordinate differential value ($\Delta X$) of the nose area 54
(15) the Y-coordinate differential value ($\Delta Y$) of the nose area 54
(16) the areal size differential value ($\Delta S$) of the mouth area 56
(17) the X-coordinate differential value ($\Delta X$) of the mouth area 56
(18) the Y-coordinate differential value ($\Delta Y$) of the mouth area 56

The control unit 11 calculates a weighted moving average for each of the eighteen differential values given above (S208). For instance, the control unit 11 calculates the weighted moving average for the areal size differential value ($\Delta S$) of the face area 50. Specifically, the control unit 11 calculates a weighted average for the N (e.g., ten) most recent areal size differential values ($\Delta S$) of the face area 50. The control unit 11 similarly calculates a weighted moving average for the X-coordinate differential value ($\Delta X$) of the face area 50 and a weighted moving average for the Y-coordinate differential value ($\Delta Y$) of the face area 50. In the same manner, the control unit 11 also calculates a weighted moving average for each differential value of other areas than the face area 50. Alternatively, the control unit 11 may calculate in Step S208 a simple moving average for each of the eighteen differential values given above.

Thereafter, the control unit 11 calculates a first principal component score to eighteenth principal component score respectively for the weighted moving averages (or simple moving averages) of the eighteen differential values given above (S209). In other words, the control unit 11 converts the weighted moving averages of the eighteen differential values given above respectively into eighteen principal component scores. The control unit 11 calculates the first to eighteenth principal component scores based on arithmetic expressions illustrated in FIG. 13.

In FIG. 13, "$z_i$" (i: a natural number from 1 through 18) represents the i-th principal component score. Specifically, "$z_1$" represents the first principal component score and "$z_{18}$" represents the eighteenth principal component score.

In FIG. 13, "$d_1$" to "$d_{18}$" respectively represent weighted moving averages (or simple moving averages) of the eighteen differential values given above. For example, "$d_1$" to "$d_{18}$" represent the following:

(1) $d_1$, $d_2$, $d_3$: the weighted moving average for the areal size differential value ($\Delta S$) of the face area 50, the weighted moving average for the X-coordinate differential value ($\Delta X$) of the face area 50, the weighted moving average for the Y-coordinate differential value ($\Delta Y$) of the face area 50
(2) $d_4$, $d_5$, $d_6$: the weighted moving average for the areal size differential value ($\Delta S$) of the left and right eyes area 52, the weighted moving average for the X-coordinate differential value ($\Delta X$) of the left and right eyes area 52, the weighted moving average for the Y-coordinate differential value ($\Delta Y$) of the left and right eyes area 52
(3) $d_7$, $d_8$, $d_9$: the weighted moving average for the areal size differential value ($\Delta S$) of the left eye area 52L, the weighted moving average for the X-coordinate differential value ($\Delta X$) of the left eye area 52L, the weighted moving average for the Y-coordinate differential value ($\Delta Y$) of the left eye area 52L
(4) $d_{10}$, $d_{11}$, $d_{12}$: the weighted moving average for the areal size differential value ($\Delta S$) of the right eye area 52R, the weighted moving average for the X-coordinate differential value ($\Delta X$) of the right eye area 52R, the weighted moving average for the Y-coordinate differential value ($\Delta Y$) of the right eye area 52R (5) $d_{13}$, $d_{14}$, $d_{15}$: the weighted moving average for the areal size differential value ($\Delta S$) of the nose area 54, the weighted moving average for the X-coordinate differential value ($\Delta X$) of the nose area 54, the weighted moving average for the Y-coordinate differential value ($\Delta Y$) of the nose area 54

(6) $d_{16}$, $d_{17}$, $d_{18}$: the weighted moving average for the areal size differential value ($\Delta S$) of the mouth area 56, the weighted moving average for the X-coordinate differential value ($\Delta X$) of the mouth area 56, the weighted moving average for the Y-coordinate differential value ($\Delta Y$) of the mouth area 56

In FIG. 13, "$L_{i\_j}$" (i, j: natural numbers from 1 through 18) represents a predetermined coefficient. How the coefficient $L_{i\_j}$ is determined is described later (see FIG. 15 described later).

After the first to eighteenth principal component scores are calculated in Step S209, the control unit 11 calculates the gaze position of the user based on the first to eighteenth principal component scores (S210). The control unit 11 calculates the gaze position of the user according to arithmetic expressions illustrated in FIG. 14.

In FIG. 14, "Gx" represents an Xs-coordinate of the gaze position of the user, and "Gy" represents a Ys-coordinate of the gaze position of the user. An Xs-coordinate and a Ys-coordinate are coordinate values in an Xs-Ys coordinate system for indicating a position in the screen. The Xs-Ys coordinate system is, for example, a coordinate system in which the upper left vertex of the screen is an origin Os, the rightward direction is the positive direction of the Xs-axis, and the downward direction is the positive direction of the Ys-axis (see FIG. 2). As in FIG. 13, "$z_i$" (i: a natural number from 1 through 18) represents the i-th principal component score. In FIG. 14, "P" and "S" are predetermined constants, and "$Q_i$" and "$T_i$" (i: a natural number from 1 through 18) are predetermined coefficients.

The arithmetic expressions of FIG. 14 use all of the first to eighteenth principal component scores to calculate the Xs-coordinate and the Ys-coordinate of the gaze position of the user. In practice, however, the coefficient "$Q_i$" or "$T_i$" is set to 0 in some cases. For instance, the coefficient $Q_{16}$ is sometimes set to 0 in the arithmetic expression for calculating the Xs-coordinate of the gaze position of the user and, in that case, the sixteenth principal component score is not used in the calculation of the Xs-coordinate of the gaze position of the user. Thus, the Xs-coordinate of the gaze position of the user is not always calculated by using all of the first to eighteenth principal component scores, but is calculated by using at least one of the first to eighteenth principal component scores. The same applies to the Ys-coordinate of the gaze position of the user. How the constants P and S and the coefficients $Q_i$ and $T_i$ are determined is described later (see FIG. 15 described later).

The gaze position of the user is calculated in Step S210 in the manner described above, and the control unit 11 records the calculated gaze position in the auxiliary storage 13 (S211). In the case where it is determined in Step S203 that the detection has failed for at least one of the areas, the control unit 11 executes Step S212, which is described later, without executing Steps S204 to S211. In other words, when the detection fails for at least one of the areas, the control unit 11 ignores the photographed image of that frame and does not calculate the gaze position of the user.

After the gaze position of the user is recorded in the auxiliary storage 13, the control unit 11 determines whether or not there is a photographed image for the next frame (S212). When there is the photographed image for the next frame, the control unit 11 obtains the photographed image for the next frame from the video data (S213). The control unit 11 subsequently executes Step S202 again.

On the other hand, when there is no photographed image for the next frame, in other words, when the photographed image of the current frame is an image of the last frame in the video data, the control unit 11 generates distribution data which indicates the distribution of the gaze position of the user recorded in the auxiliary storage 13 (S214). This concludes the description on the processing of FIGS. 11 and 12.

Now a description is given on how to determine the constants and the coefficients in the arithmetic expressions for calculating the first to eighteenth principal component scores (FIG. 13) and the arithmetic expressions for calculating the gaze position of the user (FIG. 14).

Figure 15:
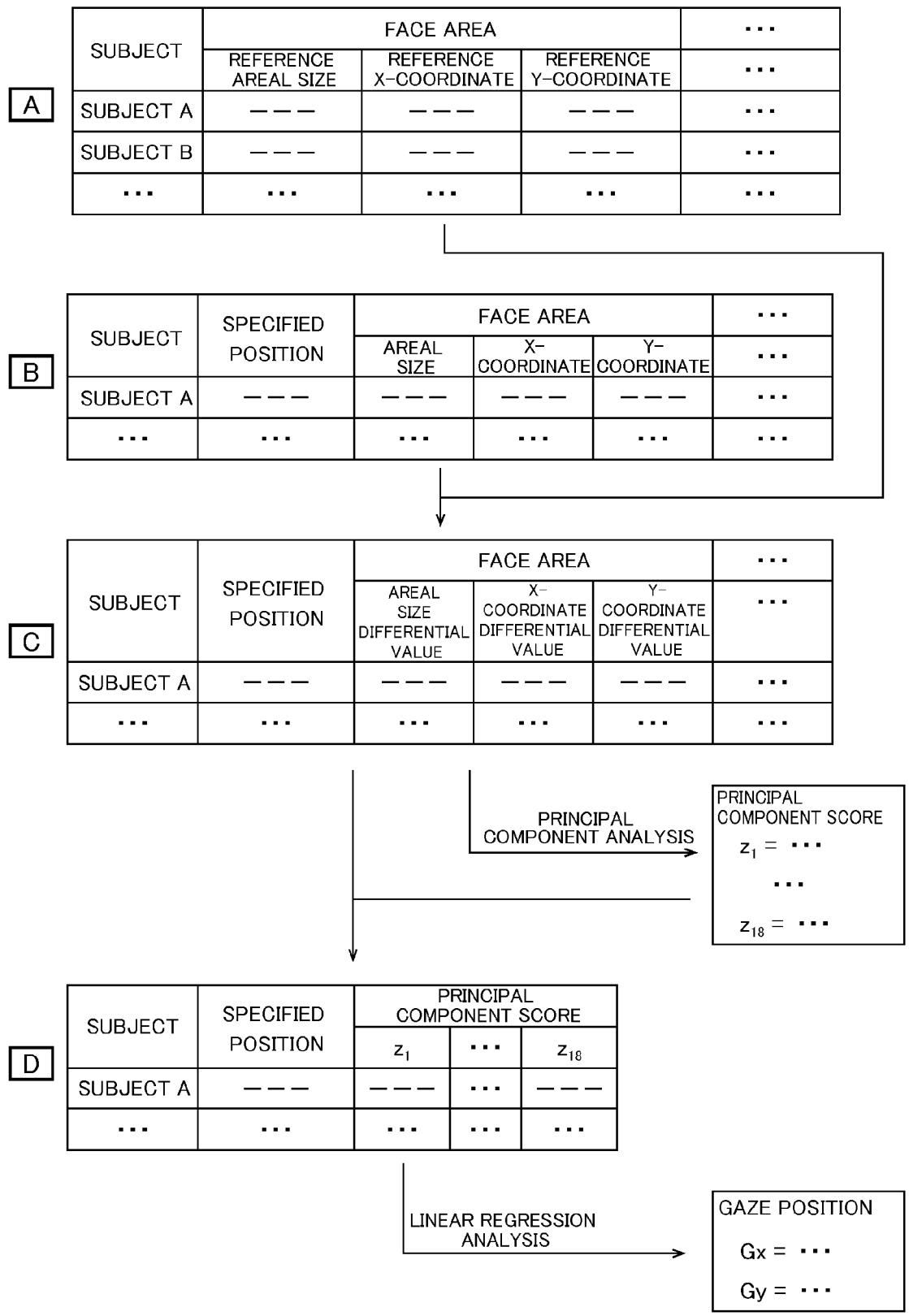
FIG. 15 are diagrams illustrating an example of how to determine the arithmetic expressions for calculating the principal component score and the arithmetic expressions for calculating the gaze position of the user.

These coefficients and constants are determined by collecting data described below from a plurality of subjects and analyzing the data. FIG. 15 is diagram illustrating how to determine the coefficients and the constants described above. The arithmetic expressions for calculating the first to eighteenth principal component scores (FIG. 13) and the arithmetic expressions for calculating the gaze position of the user (FIG. 14) need to be embedded in a program for estimating the gaze position of the user, and the data collection and analysis described below are therefore conducted at the time the program is developed. The "subjects" are, for example, developers of the program for estimating the gaze position of the user, their coworkers, or the like.

To determine the constants and the coefficients described above, an image photographed by the photographing unit 17 when the subject is looking at a predetermined position (e.g., the center point) in the screen is obtained first. Based on the photographed image, areal size information and position information are obtained for each of the face area 50, left and right eyes area 52, left eye area 52L, right eye area 52R, nose area 54, and mouth area 56 of the subject when the subject is looking at the predetermined position in the screen. Based on these pieces of areal size information and position information, reference areal size information and reference position information are obtained for each of the face area 50, left and right eyes area 52, left eye area 52L, right eye area 52R, nose area 54, and mouth area 56 of the subject (see FIG. 15(A)). This processing of obtaining the reference areal size information and the reference position information is the same as the one described with reference to FIG. 9.

Images photographed by the photographing unit 17 when the subject is looking at various positions in the screen are obtained next. Specifically, the subject is requested to use the pointing device to point to various positions in the screen, and the image photographed by the photographing unit 17 when the subject is pointing to the position in the screen is obtained. Based on the photographed image, areal size information and position information are obtained for each of the face area 50, left and right eyes area 52, left eye area 52L, right eye area 52R, nose area 54, and mouth area 56 of the subject when the subject is pointing to a position in the screen (see FIG. 15(B)).

Because a person pointing to a position in a screen with the pointing device tends to gaze at the position, the areal size information and the position information obtained here correspond to areal size information and position information of each of the face area 50, left and right eyes area 52, left eye area 52L, right eye area 52R, nose area 54, and mouth area 56 of the subject when the subject is looking at the position to which is pointed with the use of the pointing device.

Next, the areal size differential value (ΔS), the X-coordinate differential value (ΔX), and the Y-coordinate differential value (ΔY) are obtained for each of the face area 50, left and right eyes area 52, left eye area 52L, right eye area 52R, nose area 54, and mouth area 56 of the subject (see FIG. 15(C)). These are obtained based on the data of FIG. 15(A) and the data of FIG. 15(B).

Next, a principal component analysis is performed for the areal size differential value (ΔS), X-coordinate differential value (ΔX), and Y-coordinate differential value (ΔY) of each of the face area 50, left and right eyes area 52, left eye area 52L, right eye area 52R, nose area 54, and mouth area 56 of the subject. In short, the principal component analysis is performed for the eighteen differential values (three differential values for each of six areas) according to a general procedure for the principal component analysis, and, as a result, arithmetic expressions representing the first to eighteenth principal component scores (FIG. 13) are obtained. In other words, the coefficient $L_{i,j}$ (i, j: natural numbers from 1 through 18) in the arithmetic expressions for calculating the first to eighteenth principal component scores is obtained.

Next, the first to eighteenth principal component scores are calculated according to the arithmetic expressions for calculating the first to eighteenth principal component scores (FIG. 13) (see FIG. 15(D)). A linear regression analysis is then performed on the position in the screen specified by the subject (namely, a position that the subject has actually looked at) and the first to eighteenth principal components scores when the position is specified by the subject (namely, when the subject has actually looked at the position). In short, the linear regression analysis is performed according to a general procedure for the linear regression analysis, and, as a result, arithmetic expressions representing a relation between the gaze position of the user and the first to eighteenth principal component scores (FIG. 14) are obtained. In other words, the constants P and S and the coefficients $Q_i$ and $T_i$ (i: a natural number from 1 through 18) in the arithmetic expressions for calculating the gaze position of the user are obtained.

The arithmetic expressions for calculating the first to eighteenth principal component scores (FIG. 13) and the arithmetic expressions for calculating the gaze position of the user (FIG. 14) are determined in the manner described above.

With the gaze position estimation system 1 according to the first embodiment described above, a position in the screen at which a user is gazing can be estimated based on an image of the user's face that is photographed by a single photographing unit (camera).

An example of known methods of estimating a gaze position of a use based on an image of the user's face that is photographed by a single photographing unit is a method in which the center point of the user's iris in the image is detected, the projection position of the center of the user's eyeball is further estimated from the image, and the gaze position of the user is estimated based on the iris center position and the projection position of the eyeball center (e.g., JP 2011-90702 A).

Employing this method, however, requires detecting the iris center position and estimating the projection position of the eyeball center. As processing that imposes a heavy processing load needs to be executed in order to detect the iris center position and to estimate the projection position of the eyeball center, a processing load for estimating the gaze position of the user may be heavy in the case where this method is employed. In contrast, the gaze position estimation system 1 according to the first embodiment does not need to detect the iris center position or estimate the projection position of the eyeball center. The gaze position estimation system 1 according to the first embodiment can consequently keep the processing load light in the processing for estimating the gaze position of the user.

In addition, in the case where the above method is employed, as an image needs to have a high resolution in order to detect the iris center position and estimate the projection position of the eyeball center, a high-resolution photographing unit (camera) is required. In contrast, the gaze position estimation system 1 according to the first embodiment only needs to discriminate the user's face, eyes, nose, and mouth, and does not require a high-resolution camera.

Moreover, although the above method is capable of identifying which of the upward, downward, leftward, and rightward directions the user is looking in (for example, see FIG. 22 of JP 2011-90702 A), the above method lacks the level of precision that is necessary to achieve the goal of identifying which position in a relatively narrow screen the user is gazing at. In contrast, the gaze position estimation system 1 according to the first embodiment can estimate the gaze position of the user with higher precision than the above method.

In the gaze position estimation system 1 according to the first embodiment, moving averages of the areal size differential value (ΔS), the X-coordinate differential value (ΔX), and the Y-coordinate differential value (ΔY) are calculated for each of the face area 50 and other areas, and the gaze position of the user is estimated based on the moving averages (see Step S208 of FIG. 12). An eyebrow area is sometimes detected erroneously as the left and right eyes area 52 in an attempt to detect the left and right eyes area 52 or the like from the photographed image. The gaze position estimation system 1 configured in the manner described above is capable of keeping the influence of erroneous detection on the precision of gaze position estimation small even when, for example, an area is detected mistakenly from a photographed image of one frame. In other words, the configuration described above improves the precision of estimating the gaze position of the user.

In the gaze position estimation system 1 according to the first embodiment, when the detection fails for at least one of the face area 50, the left and right eyes area 52, the left eye area 52L, the right eye area 52R, the nose area 54, and the mouth area 56, the photographed image is ignored and is not used in the estimation of the gaze position of the user (see Step S203 of FIG. 11). This improves the precision of estimating the gaze position of the user.

Further, with the gaze position estimation system 1 according to the first embodiment, a position at which the user is gazing while a predetermined screen (e.g., product list page) is being displayed is obtained and, for example, a basis for re-evaluating where to display information that is hoped to catch users' eye (e.g., the advertisement 26) can therefore be acquired.

Second Embodiment

A second embodiment of the present invention is described next. The gaze position estimation system 1 according to the second embodiment of the present invention has the same configuration and the like as those according to the first embodiment (see FIGS. 1 and 2).

The gaze position estimation system 1 according to the second embodiment differs from the first embodiment in that the estimation of the gaze position of the user is executed in real time. The gaze position estimation system 1 according to the second embodiment also differs from the first embodiment in that a configuration for executing the estimation of the gaze position of the user in real time is included.

Figure 16:
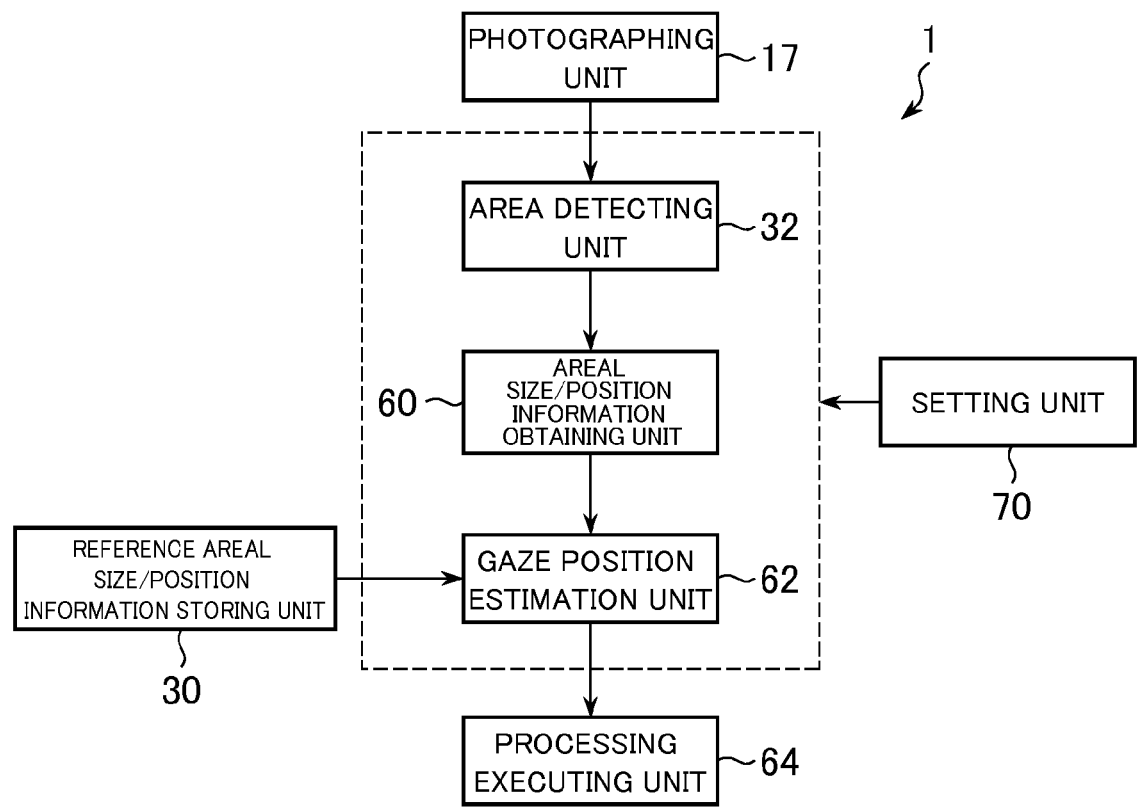
FIG. 16 is a function block diagram of the gaze position estimation system.

FIG. 16 is a function block diagram illustrating function blocks for estimating the gaze position of the user out of function blocks that are implemented in the gaze position estimation system 1 according to the second embodiment. As illustrated in FIG. 16, the gaze position estimation system 1 according to the second embodiment includes the reference areal size/position information storing unit 30, the area detecting unit 32, the areal size/position information obtaining unit 60, the gaze position estimation unit 62, the processing executing unit 64, and a setting unit 70.

As mentioned above, the gaze position estimation system 1 according to the second embodiment differs from the first embodiment in that the detection of area by the area detecting unit 32, the obtainment of areal size information and position information by the areal size/position information obtaining unit 60, and the estimation of a gaze position by the gaze position estimation unit 62 are executed in real time based on images photographed by the photographing unit 17 at predetermined time intervals (e.g., for every 1/30 second). Excepting that processing is executed in real time, the area detecting unit 32, the areal size/position information obtaining unit 60, and the gaze position estimation unit 62 are the same as the ones in the first embodiment.

Figures 17, 18:
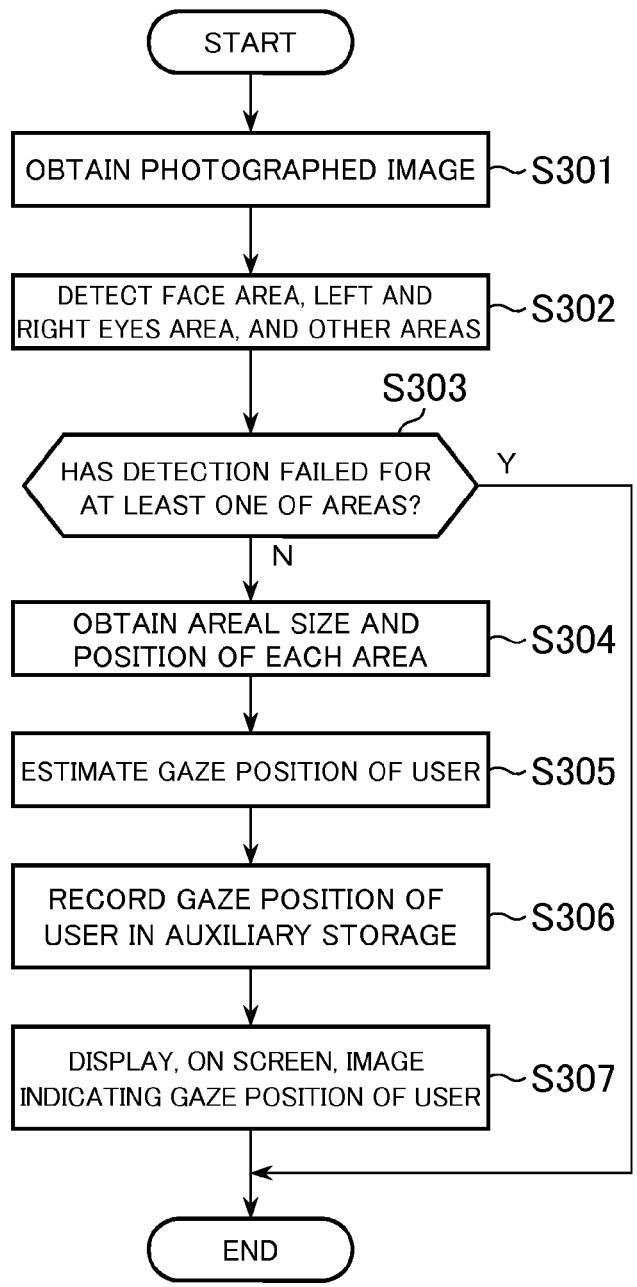
FIG. 17 is a flow chart illustrating an example of processing that is executed in the gaze position estimation system.
FIG. 18 is a diagram illustrating an example of correspondence relation information.

FIG. 17 is a flowchart illustrating an example of processing that is executed in the gaze position estimation system. 1 according to the second embodiment. The processing of FIG. 17 is executed at predetermined time intervals (e.g., for every 1/30 second) in a period for which the gaze position of the user should be estimated. The "period for which the gaze position of the user should be estimated" is, for example, a period during which a predetermined screen (an product list page or the like) is displayed.

As illustrated in FIG. 17, the control unit 11 first obtains the latest photographed image that is photographed by the photographing unit 17 (S301). The control unit 11 then detects the face area 50, the left and right eyes area 52, the left eye area 52L, the right eye area 52R, the nose area 54, and the mouth area 56 in the photographed image (S302). The processing of Step S302 is the same as that of Step S202 of FIG. 11.

The control unit 11 also determines whether or not the detection has failed for at least one of the areas (S303). When it is not determined that the detection has failed for at least one of the areas, in other words, when the detection has succeeded for all of the areas, the control unit 11 obtains areal size information and position information of each area detected in Step S302 (S304). The processing of Steps S303 and S304 are the same as that of Steps S203 and S204 of FIG. 11.

Thereafter, the control unit 11 estimates the gaze position of the user based on the areal size information and the position information of each area detected in Step S302 (S305), and records the gaze position of the user in the auxiliary storage 13 (S306). The processing of Steps S305 and S306 are the same as that of Steps S205 to S211 of FIGS. 11 and 12.

Thereafter, the control unit 11 displays, in the screen, an image that indicates the gaze position of the user (S307). For instance, the control unit 11 displays a predetermined image (marker or the like) at a position in the screen that is estimated to be the gaze position of the user.

When it is determined in Step S303 that the detection has failed for at least one of the areas, the control unit 11 ends this processing without executing the processing of Steps S304 to S307. In this case, the photographed image is ignored and the estimation of the gaze position of the user and other steps are not executed. This concludes the description on the processing of FIG. 17.

The gaze position estimation system 1 according to the second embodiment can estimate the gaze position of the user in real time because there is no need to detect the iris center position and estimate the projection position of the eyeball center and the processing load can consequently be kept light in the processing for estimating the gaze position of the user. In addition, the gaze position estimation system 1 according to the second embodiment displays the gaze position of the user on the screen in real time. This allows one to grasp at a glance the difference between a position at which the user is actually gazing at and a position estimated to be where the user is gazing at.

In the gaze position estimation system 1 according to the second embodiment, as the gaze position of the user is obtained in real time, a user interface that, for example, allows the user to give various instructions to the information processing device 10 with the gaze position can be implemented. An example of the user interface that can be implemented is one with which the information processing device 10 executes processing that is associated with a predetermined area set in the screen (e.g., scrolling of the screen) when the user keeps gazing at the predetermined area for a predetermined period of time.

Another difference of the gaze position estimation system 1 according to the second embodiment from the first embodiment is that the setting unit 70 is included. The setting unit 70 is described below.

The setting unit 70 obtains information about the processing performance of the information processing device 10 (processing performance information). The "processing performance information" is, for example, information about the processing speed of the information processing device 10. For instance, the setting unit 70 controls the information processing device 10 so that predetermined processing is executed, and measures the time required for the information processing device 10 to execute the predetermined processing. The setting unit 70 obtains the measured time as the "processing performance information". In this case, the processing performance of the information processing device 10 is higher when the measured time is shorter.

The setting unit 70 also sets an execution interval for the processing of estimating the gaze position of the user (FIG. 17) based on the processing performance information. Setting this execution interval based on the processing performance information requires correspondence relation information that indicates a correspondence relation between the processing performance information and the execution interval. FIG. 18 illustrates an example of the correspondence relation information. The setting unit 70 sets an execution interval for the processing of estimating the gaze position of the user (FIG. 17) based on the correspondence relation information of FIG. 18 and the processing performance information of the information processing device 10.

In FIG. 18, "p" represents an index value that indicates the processing performance (processing speed) of the information processing device 10. A higher index value (p) indicates higher processing performance of the information processing device 10. For instance, if "t" represents the time required for the information processing device 10 to execute the predetermined processing, the index value (p) is calculated by "p=1/t".

In FIG. 18, "Pa" and "Pb" represent predetermined values, and have a relation "Pa>Pb". "Ta", "Tb", and "Tc" represent predetermined periods of time, and have a relation "Ta>Tb>Tc". For instance, "Ta" is 1/10 second, "Tb" is 1/15 second, and "Tc" is 1/30 second.

The correspondence relation information of FIG. 18 shows that the execution interval for the processing of estimating the gaze position of the user (FIG. 17) is shorter when the processing performance of the information processing device 10 is higher. In the correspondence relation information of FIG. 18, when the index value (p) satisfies a relation "0<p≤Pa", the execution interval is set to a time (1/10 second) longer than the shooting interval (1/30 second) of the photographing unit 17. The execution interval is similarly set to a time (1/15 second) longer than the shooting interval (1/30 second) of the photographing unit 17 when the index value (p) satisfies a relation "Pa<p≤Pb".

The gaze position estimation system 1 according to the second embodiment, which includes the setting unit 70 described above, sets an execution interval for the processing of estimating the gaze position of the user (FIG. 17), based on the processing performance of the gaze position estimation system 1 (the information processing device 10). For instance, the execution interval is set long when the processing performance of the gaze position estimation system 1 (the information processing device 10) is low, and, as a result, the processing load related to the estimation of the gaze position of user is lessened. On the other hand, when the gaze position estimation system 1 (the information processing device 10) has high processing performance, the execution interval is set short, and, as a result, the frequency of executing the estimation of the gaze position of the user increases.

The setting unit 70 is not limited to the embodiment described above.

For instance, in Step S208 of FIG. 12, the N most recent values are used to calculate weighted moving averages respectively for the areal size differential value (ΔS), the X-coordinate differential value (ΔX), and the Y-coordinate differential value (ΔY) of each area detected in Step S202. The setting unit 70 may set the number (N) based on the processing performance information.

Figures 19, 20:
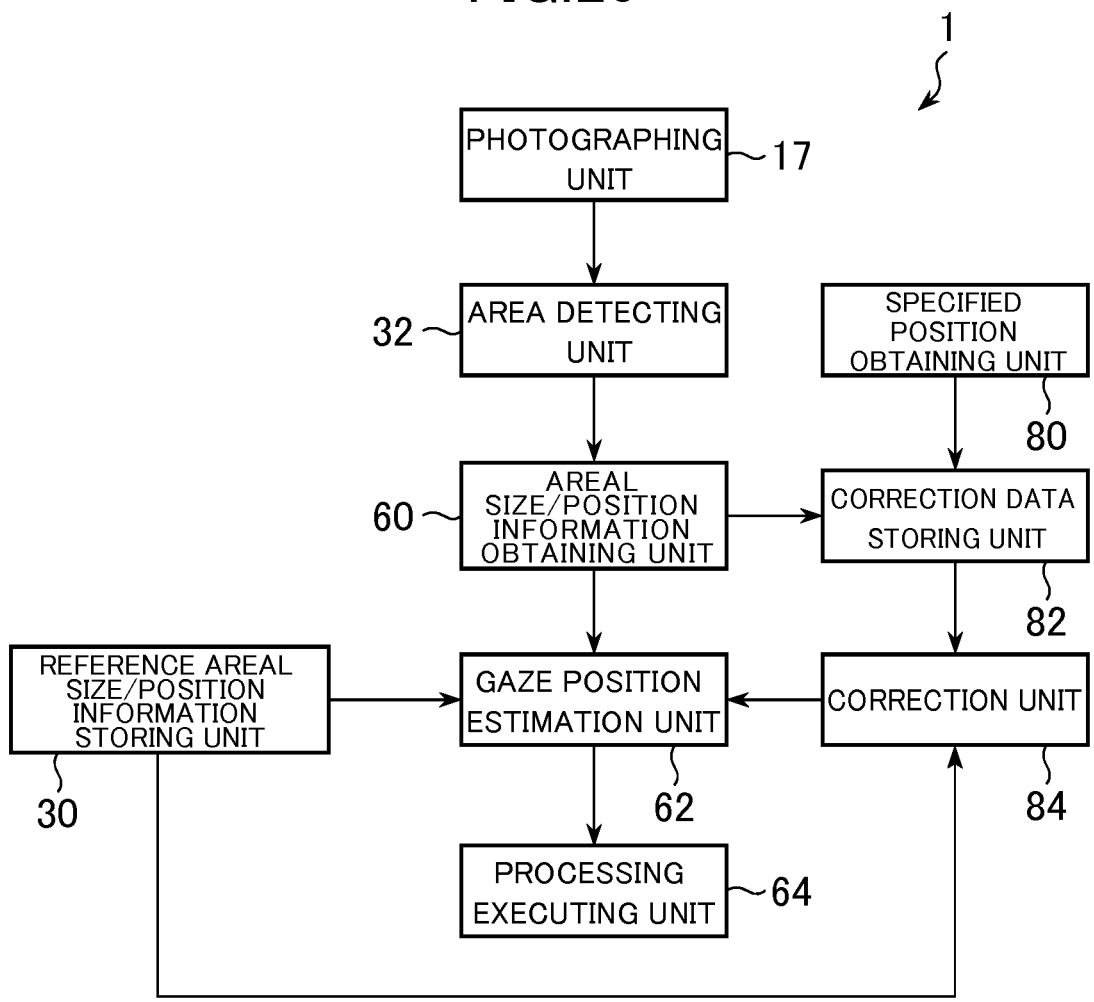
FIG. 19 is a diagram illustrating another example of the correspondence relation information.
FIG. 20 is a function block diagram of the gaze position estimation system.

Setting the number (N) based on the processing performance information requires correspondence relation information that indicates a correspondence relation between the processing performance information and the number (N). FIG. 19 illustrates an example of this correspondence relation information. The setting unit 70 sets the number (N) based on the correspondence relation information of FIG. 19 and the processing performance information of the information processing device 10.

In FIG. 19, as in FIG. 18, "p" represents an index value that indicates the processing performance (processing speed) of the information processing device 10. "Pa" and "Pb" represent predetermined values, and have a relation "Pa>Pb". "Na", "Nb", and "Nc" in FIG. 19 represent predetermined numbers, and have a relation "Na<Nb<Nc". For example, "Na" is three, "Nb" is five, and "Nc" is ten. In the correspondence relation information of FIG. 19, the number (N) is higher when the processing performance of the information processing device 10 is higher.

According to the setting unit 70 that has just been described, when the gaze position estimation system 1 (the information processing device 10) has low processing performance, for example, the number (N) is low and the processing load related to the calculation of the respective weighted moving averages of the areal size differential value (ΔS), the X-coordinate differential value (ΔX), and, as a result, the Y-coordinate differential value (ΔY) is lessened. When the gaze position estimation system 1 (the information processing device 10) has high processing performance, the number (N) is high, and, as a result, the estimation of the gaze position of the user is enhanced in precision.

Third Embodiment

A third embodiment of the present invention is described next. The gaze position estimation system 1 according to the third embodiment of the present invention has the same configuration and the like as those in the first embodiment and the second embodiment (see FIGS. 1 and 2).

A user who is, for example, attempting to point to a position in the screen with a pointing device such as the mouse 16C tends to gaze at the position that he/she is trying to indicate. The gaze position estimation system 1 according to the third embodiment differs from the first embodiment and the second embodiment in that the estimation of the gaze position of the user is enhanced in precision by taking into consideration this tendency of users.

FIG. 20 is a function block diagram illustrating function blocks for estimating the gaze position of the user out of function blocks that are implemented in the gaze position estimation system 1 according to the third embodiment. As illustrated in FIG. 20, the gaze position estimation system 1 according to the third embodiment includes the reference areal size/position information storing unit 30, the area detecting unit 32, the areal size/position information obtaining unit 60, the gaze position estimation unit 62, the processing executing unit 64, a specified position obtaining unit 80, a correction data storing unit 82, and a correction unit 84.

The gaze position estimation system 1 according to the third embodiment differs from the first embodiment and the second embodiment in that the specified position obtaining unit 80, the correction data storing unit 82, and the correction unit 84 are included. These function blocks are therefore described below. The rest of the function blocks are the same as the ones in the first embodiment or the second embodiment, and descriptions thereof are omitted here.

The specified position obtaining unit 80 obtains a position in the screen that is specified by the user. For instance, the specified position obtaining unit 80 obtains a position in the screen that the user points to with a pointing device such as the touch pad 16B or the mouse 16C.

The correction data storing unit 82 stores correction data for correcting one or more constants and/or one or more coefficients that are included in one or more arithmetic expressions for calculating the gaze position of the user (FIGS. 13 and 14).

Figures 21, 22:
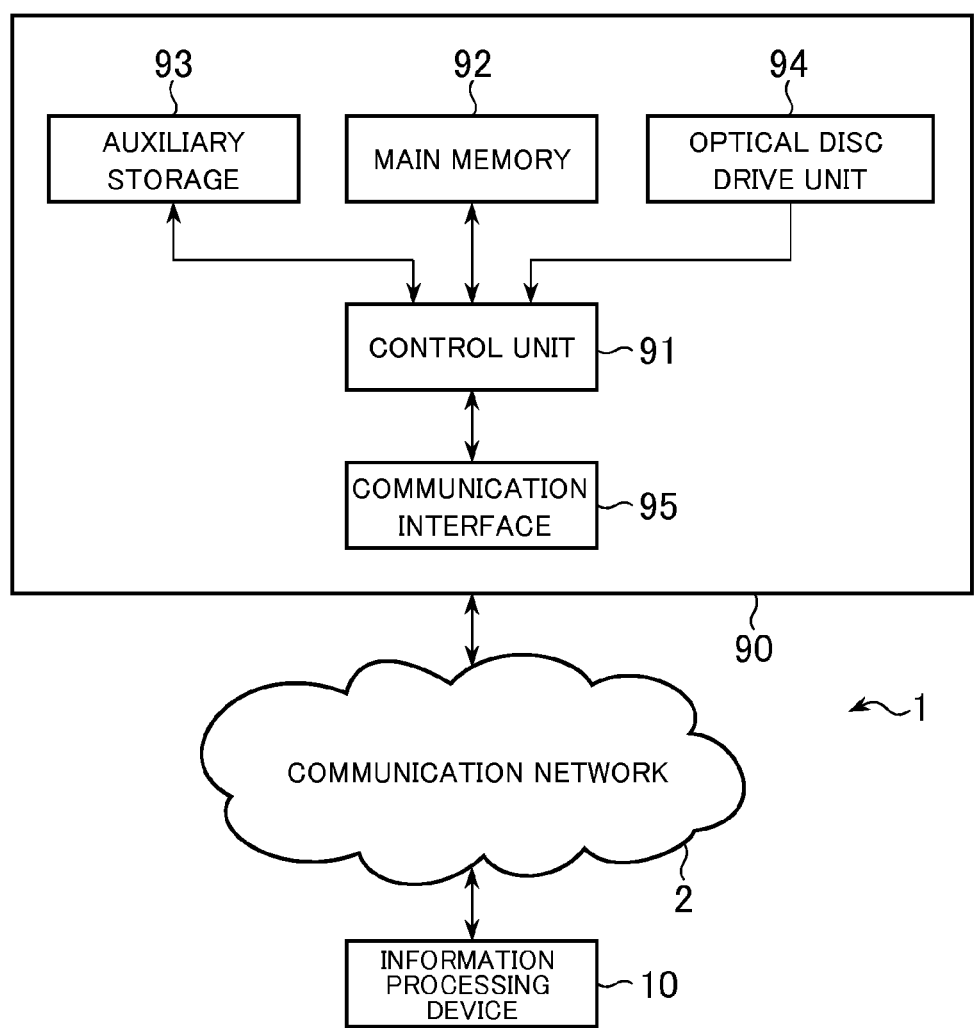
FIG. 21 is a diagram illustrating an example of what is stored in correction data storing unit.
FIG. 22 is a diagram illustrating another example of the configuration of the gaze position estimation system.

Specifically, the correction data storing unit 82 stores a position in the screen that is specified by the user in association with the respective areal size information and position information of the face area 50, the left and right eyes area 52, the left eye area 52L, the right eye area 52R, the nose area 54, and the mouth area 56 that are obtained when the position is specified by the user. FIG. 21 illustrates an example of correction data stored in the correction data storing unit 82.

The correction unit 84 corrects one or more constants and/or one or more coefficients that are included in one or more arithmetic expressions for calculating the gaze position of the user (FIGS. 13 and 14), based on the correction data.

For instance, the correction unit 84 executes, based on the correction data, processing similar to the one that has been described with reference to FIG. 15, thereby determining anew the arithmetic expressions for calculating the first to eighteenth principal component scores (FIG. 13) and the arithmetic expressions for calculating the gaze position of the user (FIG. 14). In this case, what is stored in the reference areal size/position information storing unit 30 (FIG. 8) corresponds to the data of FIG. 15(A), and the correction data stored in the correction data storing unit 82 (FIG. 21) corresponds to the data of FIG. 15(B). Desirably, a large number of records (e.g., around 10,000 records) are stored in the correction data when the arithmetic expressions for calculating the first to eighteenth principal component scores (FIG. 13) or the arithmetic expressions for calculating the gaze position of the user (FIG. 14) is determined anew.

Specifically, the correction unit 84 obtains the areal size differential value ($\Delta S$), the X-coordinate differential value ($\Delta X$), and the Y-coordinate differential value ($\Delta Y$) for each of the face area 50, left and right eyes area 52, left eye area 52L, right eye area 52R, nose area 54, and mouth area 56 of the user when the user is pointing to a position in the screen.

The correction unit 84 then performs a principal component analysis on the areal size differential value ($\Delta S$), the X-coordinate differential value ($\Delta X$), and the Y-coordinate differential value ($\Delta Y$) for each of the face area 50, left and right eyes area 52, left eye area 52L, right eye area 52R, nose area 54, and mouth area 56 of the user when the user is pointing to the position in the screen.

Specifically, the correction unit 84 performs a principal component analysis on eighteen differential values (three differential values for each of six areas) according to a general procedure for principal component analysis, and, as a result, the correction unit 84 newly obtains arithmetic expressions representing the first to eighteenth principal component scores (FIG. 13). In other words, the correction unit 84 newly obtains the coefficient $L_{i,j}$ (i, j: natural numbers from 1 through 18) in the arithmetic expressions for calculating the first to eighteenth principal component scores. In this case, the newly obtained arithmetic expressions are used in the calculation of the first to eighteenth principal component scores from then on.

The correction unit 84 calculates the first to eighteenth principal component scores when the user points to a position in the screen, according to the arithmetic expressions for calculating the first to eighteenth principal component scores (FIG. 13). A linear regression analysis is then performed on the position in the screen specified by the user (namely, the position that the user has actually looked at) and the first to eighteenth principal component scores when the position is specified by the user (namely, when the user has looked at the position).

In short, the correction unit 84 performs a linear regression analysis according to a general procedure for linear regression analysis, and, as a result, the correction unit 84 newly obtains arithmetic expressions representing a relation between the gaze position of the user and the first to eighteenth principal component scores (FIG. 14). In other words, the correction unit 84 newly obtains the constants P and S and the coefficients $Q_i$ and $T_i$ (i: a natural number from 1 through 18) in the arithmetic expressions for calculating the gaze position of the user. In this case, the newly obtained arithmetic expressions are used in the calculation of the gaze position of the user from then on.

The gaze position estimation system 1 according to the third embodiment which has been described above reviews one or more constants and/or one or more coefficients in one or more arithmetic expressions for estimating the gaze position of the user (FIGS. 13 and 14), based on areal size information and position information of the face area 50 and other areas of the user when the user is looking at a position in the screen. In other words, the gaze position estimation system 1 according to the third embodiment is capable of correcting one or more constants and/or one or more coefficients in one or more arithmetic expressions for estimating the gaze position of the user to a value that reflects the characteristics of the user's face, the user's mannerisms, and the like. As a result, the estimation of the gaze position of the user is enhanced in precision.

In the description given above, the correction data storing unit 82 stores the areal sizes and positions of the face area 50 and other areas of the user when the user is pointing to a position in the screen (FIG. 21).

Instead of storing the areal sizes and positions of the face area 50 and other areas of the user when the user is pointing to a position in the screen, the correction data storing unit 82 may store the areal size differential values ($\Delta S$), X-coordinate differential values ($\Delta X$), and Y-coordinate differential values ($\Delta Y$) of the face area 50 and other areas of the user when the user is pointing to a position in the screen.

Alternatively, instead of storing the areal sizes and positions of the face area 50 and other areas of the user when the user is pointing to a position in the screen, the correction data storing unit 82 may store an image that is photographed when the user points to a position in the screen.

Fourth Embodiment

A fourth embodiment of the present invention is described next. FIG. 22 illustrates an example of the configuration of the gaze position estimation system 1 according to the fourth embodiment of the present invention. As illustrated in FIG. 22, the gaze position estimation system 1 according to the fourth embodiment includes the information processing device 10 and a server device 90. The information processing device 10 and the server device 90 can exchange data with each other via a communication network such as the Internet.

The information processing device 10 has the same configuration as that of the information processing device 10 in the first embodiment. The server device 90 includes, as illustrated in FIG. 22, a control unit 91, a main memory 92, auxiliary storage 93, an optical disc drive unit 94, and a communication interface 95. The control unit 91, the main memory 92, the auxiliary storage 93, the optical disc drive unit 94, and the communication interface 95 are the same as the control unit 11, main memory 12, auxiliary storage 13, optical disc drive unit 14, and communication interface 15 of the information processing device 10.

The gaze position estimation system 1 according to the fourth embodiment includes the same function blocks as those in the first embodiment (FIG. 10). In the gaze position estimation system 1 according to the fourth embodiment, however, at least one of the function blocks of FIG. 10 is implemented in the server device 90. In other words, at least part of the processing of FIGS. 11 and 12 is executed in the server device 90. Concrete examples of the gaze position estimation system 1 according to the fourth embodiment are described below as Embodiment 4-1, Embodiment 4-2, and Embodiment 4-3.

Embodiment 4-1

In Embodiment 4-1, the processing executing unit 64 is implemented in the server device 90, and other function blocks than the processing executing unit 64 are implemented in the information processing device 10. Specifically, the control unit 91 of the server device 90 executes processing according to a program, to thereby function as the processing executing unit 64 in this embodiment.

In this embodiment, processing up to the estimation (calculation) of the gaze position of the user is executed in the information processing device 10, and the subsequent processing is executed in the server device 90. Specifically, out of the processing of FIGS. 11 and 12, the processing of Step S214 is executed in the server device 90 and the rest of the processing is executed in the information processing device 10.

Accordingly, the control unit 11 in this embodiment transmits data about the gaze position of the user (gaze position data) which is recorded in the auxiliary storage 13 to the server device 90, when it is determined in Step S212 that there are no photographed images for the next frame.

In this case, data about a screen that has been displayed on the display unit 18 is also transmitted to the server device 90 so that the server device 90 can understand what screen has been displayed on the display unit 18. For example, identification data of the screen that has been displayed on the display unit 18 or image data of the screen that has been displayed on the display unit 18 is transmitted as the "data about the screen that has been displayed on the display unit 18". In the case where the state of a screen displayed on the display unit 18 changes in response to the user's operation (for example, in the case where the screen is designed to scroll in response to the user's operation), operation history data which indicates the history of operation performed by the user after the start of display of the screen is transmitted to the server device 90 as well.

When data that is transmitted from the information processing device 10 is received, the control unit 91 of the server device 90 executes the same processing as Step S214 based on the received data.

Embodiment 4-2

In Embodiment 4-2, the gaze position estimation unit 62 and the processing executing unit 64 are implemented in the server device 90 (gaze position estimation device), and other function blocks than the gaze position estimation unit 62 and the processing executing unit 64 are implemented in the information processing device 10. Specifically, the control unit 91 of the server device 90 executes processing according to a program, to thereby function as the gaze position estimation unit 62 and the processing executing unit 64 in this embodiment.

In this embodiment, processing up to the calculation of the areal sizes and positions of the face areas 50 and other areas is executed in the information processing device 10, and the subsequent processing is executed in the server device 90. Specifically, in this embodiment, out of the processing of FIGS. 11 and 12, Steps S205 to S211 and Step S214 are executed in the server device 90 and the rest of the processing is executed in the information processing device 10.

In short, the processing of FIGS. 11 and 12 from which Steps S205 to S211 and Step S214 are excluded is executed in the information processing device 10 in this embodiment. The information processing device 10 in this embodiment transmits data indicating the areal sizes and positions of the face area 50 and other areas in photographed images of the respective frames to the server device 90. Data about a screen that has been displayed on the display unit 18 is transmitted to the server device 90 as well. The server device 90 executes the same processing as Steps S205 to S211 and Step S214 of FIGS. 11 and 12 based on the data received from the information processing device 10.

Alternatively, processing up to the calculation of the areal size differential values (ΔS), X-coordinate differential values (ΔX), and Y-coordinate differential values (ΔY) of the face area 50 and other areas may be executed in the information processing device 10 while the subsequent processing is executed in the server device 90. In other words, Steps S208 to S211 and Step S214 out of the processing of FIGS. 11 and 12 may be executed in the server device 90 while the rest of the processing is executed in the information processing device 10.

The information processing device 10 in this case executes the processing of FIGS. 11 and 12 from which Steps S208 to S211 and Step S214 are excluded. Data indicating the areal size differential values (ΔS), X-coordinate differential values (ΔX), and Y-coordinate differential values (ΔY) of the face area 50 and other areas in photographed images of the respective frames is transmitted from the information processing device 10 to the server device 90. Data about a screen that has been displayed on the display unit 18 is transmitted to the server device 90 as well. The server device 90 executes the same processing as Steps S208 to S211 and Step S214 of FIGS. 11 and 12 based on the data received from the information processing device 10.

Alternatively, processing up to the calculation of weighted moving averages of the areal size differential values (ΔS), X-coordinate differential values (ΔX), and Y-coordinate differential values (ΔY) of the face area 50 and other areas may be executed in the information processing device 10 while the subsequent processing is executed in the server device 90. In other words, Steps S209 to S211 and Step S214 out of the processing of FIGS. 11 and 12 may be executed in the server device 90 while the rest of the processing is executed in the information processing device 10.

Embodiment 4-3

In Embodiment 4-3, the area detecting unit 32, the areal size/position information obtaining unit 60, the gaze position estimation unit 62, and the processing executing unit 64 are implemented in the server device 90 (gaze position estimation device). Specifically, the control unit 91 of the server device 90 executes processing according to a program, to thereby function as the area detecting unit 32, the areal size/position information obtaining unit 60, the gaze position estimation unit 62, and the processing executing unit 64 in this embodiment.

In this embodiment, photographed images (video data) of the photographing unit 17 are transmitted from the information processing device 10 to the server device 90. Data about a screen that has been displayed on the display unit 18 is transmitted to the server device 90 as well. The server device 90 executes the processing of FIGS. 11 and 12 based on the photographed images (video data) received from the information processing device 10.

According to Embodiment 4-1 and Embodiment 4-2 described above, the amount of data transmitted from the information processing device 10 to the server device 90 is smaller than in Embodiment 4-3, and the load on a communication network 2 is accordingly lessened.

The gaze position estimation system 1 according to the fourth embodiment may execute the estimation of the gaze position of the user in real time as in the second embodiment.

For instance, as in Embodiment 4-2, Step S305 out of the processing of FIG. 17 may be executed in the server device 90 while other processing steps than Step S305 are executed in the information processing device 10. In this case, after Step S304 is executed, data indicating the areal sizes and positions of the face area 50 and other areas is transmitted from the information processing device 10 to the server device 90. The server device 90 executes the same processing as Step S305 based on the data received from the information processing device 10 to estimate the gaze position of the user. The estimated gaze position of the user is returned from the server device 90 to the information processing device 10, and then Steps S306 and S307 are executed in the information processing device 10.

Alternatively, part of Step S305 may be executed in the server device 90 while the rest of the processing is executed in the information processing device 10. In this case, for example, the areal size differential values ($\Delta S$), the X-coordinate differential values ($\Delta X$), and the Y-coordinate differential values ($\Delta Y$) of the face area 50 and other areas are calculated, and then data indicating the areal size differential values ($\Delta S$), X-coordinate differential values ($\Delta X$), and Y-coordinate differential values ($\Delta Y$) of the face area 50 and other areas is transmitted from the information processing device 10 to the server device 90. The server device 90 estimates the gaze position of the user based on the data received from the information processing device 10. The estimated gaze position of the user is returned from the server device 90 to the information processing device 10, and then Steps S306 and S307 are executed in the information processing device 10.

Alternatively, the weighted moving averages are calculated for the areal size differential values ($\Delta S$), the X-coordinate differential values ($\Delta X$), and the Y-coordinate differential values ($\Delta Y$) of the face area 50 and other areas are calculated, and then data indicating the weighted moving averages of the areal size differential values ($\Delta S$), the X-coordinate differential values ($\Delta X$), and the Y-coordinate differential values ($\Delta Y$) of the face area 50 and other areas is transmitted from the information processing device 10 to the server device 90. The server device 90 estimates the gaze position of the user based on the data received from the information processing device 10. The estimated gaze position of the user is returned from the server device 90 to the information processing device 10, and then Steps S306 and S307 are executed in the information processing device 10.

As in Embodiment 4-3, for example, Steps S302 to S305 out of the processing of FIG. 17 may be executed in the server device 90 while the rest of the processing is executed in the information processing device 10. In this case, the photographed image that is obtained in Step S301 is transmitted from the information processing device 10 to the server device 90. The server device 90 executes the same processing as Steps S302 to S305 based on the photographed image received from the information processing device 10 to estimate the gaze position of the user. The estimated gaze position of the user is returned from the server device 90 to the information processing device 10, and then Steps S306 and S307 are executed in the information processing device 10.

The server device 90 in the fourth embodiment described above may be a Web server device that provides a Web page to the information processing device 10, or may be a server device separate from the Web server device (i.e., a dedicated server device for estimating the gaze position of the user). For instance, the server device 90 can be a Web server device of an electronic commerce site that provides a product list page as illustrated in FIG. 3 to the information processing device 10. In this case, the Web server device of the electronic commerce site can obtain data about a gaze position of the user in a Web page (e.g., a product list page) that the Web server device provides to the information processing device 10. This means that the Web server device can acquire for each Web page a consideration for the re-evaluation of the display position of various types of information that is hoped to catch users' eye (e.g., advertisements).

The present invention is not limited to the first to fourth embodiments described above.

For instance, while the gaze position of the user is estimated by using all of six areas, the face area 50, the left and right eyes area 52, the left eye area 52L, the right eye area 52R, the nose area 54, and the mouth area 56 in the description given above, only some of the six areas may be used. For example, only the face area 50, the left and right eyes area 52, and the nose area 54 may be used.

To give another example, the gaze position of the user may be estimated by using other areas than the face area 50, the left and right eyes area 52, the left eye area 52L, the right eye area 52R, the nose area 54, and the mouth area 56.

To give still another example, the second embodiment and the third embodiment may be combined. Alternatively, at least one of the second embodiment and the third embodiment may be combined with the fourth embodiment.

In the case where the second embodiment and the fourth embodiment are combined, the correction data storing unit 82 and the correction unit 84 may be implemented in the information processing device 10 or may be implemented in the server device 90. In the case where the correction data storing unit 82 is implemented in the server device 90 (namely, in the case where the server device 90 stores correction data of all users), the correction unit 84 may use correction data of other users as well. In that case, the user's correction data may be weighted more heavily than correction data of other users.

To give yet still another example, two separate devices one of which includes the display unit and the other of which includes the photographing unit and the control unit may be used. For instance, a camera (the photographing unit) may be installed above or below a home-use television set, or in a similar place, and the user's gaze position in a screen of the home-use television set may be estimated by an information processing device (e.g., personal computer).

The invention claimed is:

1. A gaze position estimation system, comprising:
a camera that photographs a face of a user who is looking at a screen displayed on a display;
at least one processor; and
at least one memory device that stores a plurality of instructions, which when executed by the at least one processor, cause the at least one processor to:
detect, from a photographed image of the camera, an eye area of the user and at least one of a face area of the user and a predetermined part area of the user, the predetermined part area being an area of a predetermined part of the user other than the user's eyes;
obtain areal size information and position information of the eye area, and areal size information and position information of the at least one of the face area and the predetermined part area; and estimate a position in the screen that the user is gazing at, based on the areal size information and the position information, wherein the plurality of instructions further cause the at least one processor to obtain reference areal size information and reference position information of the eye area, based on areal size information and position information of the eye area when the user is looking at a reference position in the screen, and obtain reference areal size information and reference position information of the at least one of the face area and the predetermined part area, based on areal size information and position information of the at least one of the face area and the predetermined part area when the user is looking at the reference position in the screen, wherein the plurality of instructions cause the at least one processor to estimate the position in the screen that the user is gazing at, based on a first difference between the areal size information of the eye area and the reference areal size information of the eye area, a second difference between the position information of the eye area and the reference position information of the eye area, a third difference between the areal size information of the at least one of the face area and the predetermined part area and the reference areal size information of the at least one of the face area and the predetermined part area, and a fourth difference between the position information of the at least one of the face area and the predetermined part area and the reference position information of the at least one of the face area and the predetermined part area.

2. The gaze position estimation system according to claim 1, the plurality of instructions further cause the at least one processor to calculate a moving average for each of the first difference, the second difference, the third difference, and the fourth difference, wherein the plurality of instructions cause the at least one processor to estimate the position in the screen that the user is gazing at, based on the moving average.

3. The gaze position estimation system according to claim 1,
wherein the plurality of instructions further cause the at least one processor to determine whether or not the detection by the at least one processor has failed for any one of the areas, and
wherein the plurality of instructions cause the at least one processor to inhibit execution of the estimation of the position in the screen that the user is gazing at, in the case where the detection has failed for any one of the areas.

4. The gaze position estimation system according to claim 1,
wherein the plurality of instructions further cause the at least one processor to display, in the screen, an image that indicates the position in the screen that is estimated by the at least one processor that the user is gazing at.

5. The gaze position estimation system according to claim 1, further comprising an information processing device,
wherein the information processing device comprises the at least one processor and the at least one memory device,
wherein the camera photographs the face of the user for every first predetermined period of time,
wherein, of the photographed images photographed by the camera for every first predetermined period of time, the photographed images for every second predetermined period of time longer than the first predetermined period of time are set as targets of the detection by the at least one processor, and
wherein the plurality of instructions further cause the at least one processor to set the second predetermined period of time based on information about processing performance of the information processing device.

6. The gaze position estimation system according to claim 2, further comprising an information processing device, wherein the information processing device comprises the at least one processor and the at least one memory device, wherein the plurality of instructions cause the at least one processor to calculate the moving average for each of the first difference, the second difference, the third difference, and the fourth difference, based on a predetermined number of most recent results obtained by the at least one processor, and wherein the plurality of instructions further cause the at least one processor to set the predetermined number based on information about processing performance of the information processing device.

7. The gaze position estimation system according to claim 1,
wherein the plurality of instructions cause the at least one processor to estimate the position in the screen that the user is gazing at, by executing an operation according to one or more arithmetic expressions based on the areal size information and the position information, and
wherein the plurality of instructions further cause the at least one processor to:
obtain a position in the screen that is specified by the user; and
correct at least one of a constant or a coefficient that is included in the one or more arithmetic expressions, based on the position in the screen that is specified by the user, areal size information and position information of the eye area when the position is specified by the user, and areal size information and position information of at least one of the face area or the predetermined part area when the position is specified by the user.

8. The gaze position estimation system according to claim 1,
wherein the plurality of instructions cause the at least one processor to detect from the photographed image the face area of the user, a combined left and right eye area of the user, an individual left eye area of the user, an individual right eye area of the user, a nose area of the user, and a mouth area of the user, and
wherein the plurality of instructions cause the at least one processor to obtain areal size information and position information of each of the face area, the combined left and right eye area, the individual left eye area, the individual right eye area, the nose area, and the mouth area.

9. The gaze position estimation system according to claim 1, further comprising:
an information processing device which is connected to the camera; and
a server device which is capable of communication from the information processing device,
wherein the information processing device transmits the photographed image to the server device, and
wherein the server device comprises the at least one processor and the at least one memory device.

10. The gaze position estimation system according to claim 1, further comprising:

an information processing device which is connected to the camera; and a server device which is capable of communication from the information processing device, wherein the information processing device comprises:
  at least one first processor; and
  at least one first memory device that stores a plurality of instructions, which when executed by the at least one first processor, cause the at least one first processor to:
  detect, from the photographed image, the eye area and at least one of the face area and the predetermined part area; and
  transmits a result of the detection by the at least one first processor to the server device, and
wherein the server device comprises:
  at least one second processor; and
  at least one second memory device that stores a plurality of instructions, which when executed by the at least one second processor, cause the at least one second processor to:
  obtain the areal size information and the position information of the eye area, and the areal size information and the position information of the at least one of the face area and the predetermined part area; and
  estimate a position in the screen that the user is gazing at, based on the areal size information and the position information.

11. The gaze position estimation system according to claim 1, further comprising:
  an information processing device which is connected to the camera; and
  a server device which is capable of communication from the information processing device,
  wherein the information processing device comprises:
    at least one first processor; and
    at least one first memory device that stores a plurality of instructions, which when executed by the at least one first processor, cause the at least one first processor to:
    detect, from the photographed image, the eye area and at least one of the face area and the predetermined part area;
    obtain the areal size information and the position information of the eye area, and the areal size information and the position information of the at least one of the face area and the predetermined part area; and
    transmit the areal size information and the position information that are obtained by the at least one first processor to the server device, and
  wherein the server device comprises:
    at least one second processor; and
    at least one second memory device that stores a plurality of instructions, which when executed by the at least one second processor, cause the at least one second processor to:
    estimate the position in the screen that the user is gazing at, based on the areal size information and the position information.

12. The gaze position estimation system according to claim 1, further comprising:
  an information processing device which is connected to the camera; and
  a server device which is capable of communication from the information processing device,
  wherein the information processing device comprises:
    at least one first processor; and
    at least one first memory device that stores a plurality of instructions, which when executed by the at least one first processor, cause the at least one first processor to:
    detect, from the photographed image, the eye area and at least one of the face area and the predetermined part area;
    obtain the areal size information and the position information of the eye area, and the areal size information and the position information of the at least one of the face area and the predetermined part area;
    estimate the position in the screen that the user is gazing at, based on the areal size information and the position information; and
    transmit, to the server device, gaze position data related to a result of the estimation by the at least one first processor, and
  wherein the server device comprises:
    at least one second processor; and
    at least one second memory device that stores a plurality of instructions, which when executed by the at least one second processor, cause the at least one second processor to:
    receive the gaze position data; and
    execute totalization processing with regard to the position in the screen that the user is gazing at, based on the gaze position data.

13. A gaze position estimation device, comprising:
  at least one processor; and
  at least one memory device that stores a plurality of instructions, which when executed by the at least one processor, cause the at least one processor to:
  obtain areal size information and position information for an eye area of a user and for at least one of a face area of the user and a predetermined part area of the user, the predetermined part area being an area of a predetermined part of the user other than the user's eyes, the eye area and the at least one of the face area and the predetermined part area being detected from a photographed image of a camera that photographs a face of the user who is looking at a screen displayed on a display; and
  estimate a position in the screen that the user is gazing at, based on the areal size information and the position information, wherein the plurality of instructions further cause the at least one processor to obtain reference areal size information and reference position information of the eye area, based on areal size information and position information of the eye area when the user is looking at a reference position in the screen, and obtain reference areal size information and reference position information of the at least one of the face area and the predetermined part area, based on areal size information and position information of the at least one of the face area and the predetermined part area when the user is looking at the reference position in the screen,
  wherein the plurality of instructions cause the at least one processor to estimate the position in the screen that the user is gazing at, based on a first difference between the areal size information of the eye area and the reference areal size information of the eye area, a second difference between the position information of the eye area and the reference position information of the eye area, a third difference between the areal size information of the at least one of the face area and the predetermined part area and the reference areal size information of the at least one of the face area and the predetermined part area, and a fourth difference between the position information of the at least one of the face area and the predetermined part area and the reference position information of the at least one of the face area and the predetermined part area.

14. A method of controlling a gaze position estimation device, comprising:
obtaining areal size information and position information for an eye area of a user and for at least one of a face area of the user and a predetermined part area of the user, the predetermined part area being an area of a predetermined part of the user other than the user's eyes, the eye area and the at least one of the face area and the predetermined part area being detected from a photographed image of a camera that photographs a face of the user who is looking at a screen displayed on a display; and
estimating a position in the screen that the user is gazing at, based on the areal size information and the position information,
wherein the method further comprises obtaining reference areal size information and reference position information of the eye area, based on areal size information and position information of the eye area when the user is looking at a reference position in the screen, and obtaining reference areal size information and reference position information of the at least one of the face area and the predetermined part area, based on areal size information and position information of the at least one of the face area and the predetermined part area when the user is looking at the reference position in the screen,
wherein the estimating comprises estimating the position in the screen that the user is gazing at, based on a first difference between the areal size information of the eye area and the reference areal size information of the eye area, a second difference between the position information of the eye area and the reference position information of the eye area, a third difference between the areal size information of the at least one of the face area and the predetermined part area and the reference areal size information of the at least one of the face area and the predetermined part area, and a fourth difference between the position information of the at least one of the face area and the predetermined part area and the reference position information of the at least one of the face area and the predetermined part area.

15. A non-transitory computer-readable information storage medium having recorded thereon a program for causing a computer to:
obtain areal size information and position information for an eye area of a user and for at least one of a face area of the user and a predetermined part area of the user, the predetermined part area being an area of a predetermined part of the user other than the user's eyes, the eye area and the at least one of the face area and the predetermined part area being detected from a photographed image of a camera that photographs a face of the user who is looking at a screen displayed on a display; and
estimate a position in the screen that the user is gazing at, based on the areal size information and the position information, wherein the program further causes the computer to obtain reference areal size information and reference position information of the eye area, based on areal size information and position information of the eye area when the user is looking at a reference position in the screen, and obtain reference areal size information and reference position information of the at least one of the face area and the predetermined part area, based on areal size information and position information of the at least one of the face area and the predetermined part area when the user is looking at the reference position in the screen,
wherein the program causes the computer to estimate the position in the screen that the user is gazing at, based on a first difference between the areal size information of the eye area and the reference areal size information of the eye area, a second difference between the position information of the eye area and the reference position information of the eye area, a third difference between the areal size information of the at least one of the face area and the predetermined part area and the reference areal size information of the at least one of the face area and the predetermined part area, and a fourth difference between the position information of the at least one of the face area and the predetermined part area and the reference position information of the at least one of the face area and the predetermined part area.

16. The gaze position estimation system according to claim 1, wherein the plurality of instructions cause the at least one processor to: calculate principal component scores using (i) first differential information regarding the first difference, (ii) second differential information regarding the second difference, (iii) third differential information regarding the third difference, and (iv) fourth differential information regarding the fourth difference; and estimate the position in the screen that the user is gazing at, using the calculated principal component scores.

17. The gaze position estimation system according to claim 16,
wherein the plurality of instructions cause the at least one processor to:
calculate the principal component scores based on first arithmetic expressions, using the first differential information, the second differential information, the third differential information, and the fourth differential information; and
estimate the position in the screen that the user is gazing at, based on second arithmetic expressions, using the calculated principal component scores,
wherein the first arithmetic expressions are arithmetic expressions for calculating the principal component scores based on the first differential information, the second differential information, the third differential information, and the fourth differential information, and are arithmetic expressions obtained by performing principal component analysis based on the first differential information, the second differential information, the third differential information, and the fourth differential information obtained from results of measurements performed in advance on a plurality of subjects, and
wherein the second arithmetic expressions are arithmetic expressions for calculating the position in the screen that the user is gazing at, based on the principal component scores, and are arithmetic expressions obtained based on a result of the principal component analysis.

\* \* \* \* \*